(12) United States Patent
Sekine et al.

(10) Patent No.: US 10,921,562 B2
(45) Date of Patent: Feb. 16, 2021

(54) IMAGING LENS

(71) Applicant: KANTATSU CO., LTD., Yaita (JP)

(72) Inventors: Yukio Sekine, Sukagawa (JP); Masaya Hashimoto, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 179 days.

(21) Appl. No.: 16/272,723

(22) Filed: Feb. 11, 2019

(65) Prior Publication Data

US 2019/0170981 A1 Jun. 6, 2019

Related U.S. Application Data

(63) Continuation of application No. 15/252,902, filed on Aug. 31, 2016, now Pat. No. 10,203,482.

(30) Foreign Application Priority Data

Aug. 31, 2015 (JP) .................. 2015-170645

(51) Int. Cl.
 *G02B 13/18* (2006.01)
 *G02B 9/62* (2006.01)
 *G02B 13/00* (2006.01)
 *G02B 5/00* (2006.01)

(52) U.S. Cl.
 CPC .......... *G02B 13/0045* (2013.01); *G02B 9/62* (2013.01); *G02B 5/005* (2013.01); *G02B 13/002* (2013.01); *G02B 13/18* (2013.01)

(58) Field of Classification Search
 CPC ...... G02B 13/0045; G02B 9/62; G02B 13/18; G02B 5/005; G02B 13/002

USPC .................... 359/713, 738–740, 756, 757
See application file for complete search history.

(56) References Cited

U.S. PATENT DOCUMENTS

| 8,514,499 | B2* | 8/2013 | Hsu .................... G02B 9/62 |
| | | | 359/713 |
| 8,854,745 | B1 | 10/2014 | Chen |
| 2012/0194726 | A1 | 8/2012 | Huang et al. |
| 2012/0243108 | A1 | 9/2012 | Tsai et al. |
| 2013/0003193 | A1 | 1/2013 | Huang |
| 2013/0033762 | A1 | 2/2013 | Tsai et al. |
| 2013/0070346 | A1 | 3/2013 | Hsu et al. |
| 2014/0063616 | A1 | 3/2014 | Okano et al. |

(Continued)

FOREIGN PATENT DOCUMENTS

| CN | 201974571 U | 9/2011 |
| CN | 202217102 U | 5/2012 |

(Continued)

*Primary Examiner* — Evelyn A Lester
(74) *Attorney, Agent, or Firm* — Hamre, Schumann, Mueller & Larson, P.C.

(57) ABSTRACT

A compact imaging lens which meets the demands for low-profileness and a wide field of view and corrects various aberrations properly. The imaging lens includes, in order from an object side to an image side: an aperture stop; a first lens with positive refractive power having a convex surface on the object side; a second lens with negative refractive power as a meniscus lens having a concave surface on the image side; a third lens having a concave surface on the image side; a fourth lens; a fifth lens with positive refractive power having a convex surface on the image side; and a sixth lens with negative refractive power having a concave surface on each of the object side and the image side.

21 Claims, 25 Drawing Sheets

(56) References Cited

U.S. PATENT DOCUMENTS

| | | |
|---|---|---|
| 2014/0153117 A1 | 6/2014 | Hagiwara |
| 2014/0185141 A1 | 7/2014 | Lee et al. |
| 2014/0211326 A1 | 7/2014 | Lai |
| 2014/0347745 A1 | 11/2014 | Shinohara |
| 2015/0015765 A1 | 1/2015 | Lee |
| 2015/0054994 A1 | 2/2015 | Tsai et al. |
| 2015/0226941 A1 | 8/2015 | Fukaya |
| 2015/0241662 A1 | 8/2015 | Hashimoto |
| 2015/0277085 A1 | 10/2015 | Noda |
| 2015/0338609 A1 | 11/2015 | Hsu et al. |
| 2015/0362702 A1 | 12/2015 | Tang et al. |
| 2016/0004050 A1* | 1/2016 | Tang ............... G02B 13/0045 359/713 |
| 2016/0018627 A1 | 1/2016 | Lee |
| 2016/0131872 A1 | 5/2016 | Tang et al. |
| 2016/0187621 A1 | 6/2016 | Chen |
| 2016/0238820 A1 | 8/2016 | Tsai et al. |
| 2016/0313536 A1 | 10/2016 | Kubota et al. |
| 2017/0023772 A1 | 1/2017 | Teraoka |

FOREIGN PATENT DOCUMENTS

| | | |
|---|---|---|
| CN | 202330846 U | 7/2012 |
| CN | 202522758 U | 11/2012 |
| CN | 104238073 A | 12/2014 |
| CN | 104570284 A | 4/2015 |
| CN | 204422849 U | 6/2015 |
| CN | 205067846 U | 3/2016 |
| EP | 2749925 A1 | 7/2014 |
| EP | 2824493 A1 | 1/2015 |
| JP | 2012155223 A | 8/2012 |
| JP | 2014-232147 A | 12/2014 |
| JP | 58-09769 B1 | 11/2015 |
| JP | 2015-225102 A | 12/2015 |
| JP | WO2014-175058 | 2/2017 |
| TW | 201333575 A | 8/2013 |
| TW | 201350901 A | 12/2013 |
| TW | 201423147 A | 6/2014 |
| TW | 201447360 A | 12/2014 |
| TW | M504250 U | 7/2015 |
| TW | 201546482 A | 12/2015 |
| TW | 1534497 B | 5/2016 |

\* cited by examiner

IMAGING LENS

BACKGROUND OF THE INVENTION

Field of the Invention

The present invention relates to an imaging lens which forms an image of an object on a solid-state image sensor such as a CCD sensor or C-MOS sensor used in a compact image pickup device, and more particularly to an imaging lens which is built in an image pickup device mounted in an increasingly compact and low-profile smartphone, mobile phone, PDA (Personal Digital Assistant), game console, information terminal such as a PC or robot, home appliance or vehicle with a camera function.

Description of the Related Art

In recent years, there has been a general tendency that many information terminals have a camera function. Also, various products with high convenience such as home appliances with a camera have been introduced into the market. The demand for home appliances and information terminals which have a camera function is expected to grow and efforts to develop such products will be accelerated.

The imaging lenses mounted in such products are strongly anticipated not only to provide high resolution to cope with an increase in the number of pixels but also to be compact and low-profile enough to match the trend toward a more compact and low-profile product and offer high brightness and a wide field of view.

One approach to meeting this demand may be to increase the number of constituent lenses from five to six, in order to obtain a higher resolution, since an imaging lens composed of six constituent lenses is higher in design freedom and more advantageous in correction of various aberrations than an imaging lens composed of five constituent lenses.

However, when the imaging lens is composed of six constituent lenses, the larger number of constituent lenses may lead to a longer total track length. Also, in order to provide an imaging lens which meets all the demands for low-profileness, a wide field of view and a low F-value, the problem of difficulty in correction of aberrations in the peripheral area of an image must be addressed. Unless the problem is addressed, it is difficult to deliver high optical performance throughout the image.

In the conventional art, for example, the imaging lenses described in Patent Literature 1 (JP-A-2012-155223) and Patent Literature 2 (US 2012/0243108) are known as imaging lenses composed of six constituent lenses.

Patent Literature 1 discloses an imaging lens which includes, in order from an object side, a first lens group with positive refractive power, a second lens group with negative refractive power, a third lens group with positive refractive power, a fourth lens group with negative refractive power, a fifth lens group with positive refractive power, and a sixth lens group with negative refractive power.

Patent Literature 2 discloses an imaging lens which includes, in order from an object side, a first lens with positive refractive power having a convex surface on the object side, a second lens, a third lens, a fourth lens having at least one aspheric surface, a fifth lens having a convex surface on the object side and a concave surface on an image side, and a sixth biconcave lens having at least one aspheric surface.

SUMMARY OF THE INVENTION

The imaging lens described in Patent Literature 1 provides high brightness with an F-value of about 2.0 to 2.4, and ensures high optical performance. However, its total track length is about 8 mm and its field of view is about 66 to 70 degrees, which implies that the demands for low-profileness and a wide field of view cannot be met sufficiently. If the imaging lens described in Patent Literature 1 is adopted to achieve low-profileness and a wide field of view, it is very difficult to correct aberrations in the peripheral area and deliver high optical performance.

The imaging lens described in Patent Literature 2 is a relatively low-profile lens which has a total track length of about 5 to 6 mm and a ratio of total track length to the diagonal length of the effective imaging plane of the image sensor (hereinafter referred to as "TTL-to-diagonal ratio") of about 1.0 and corrects various aberrations properly. However, its field of view is about 70 degrees and its F-value is about 2.6 to 3.0, suggesting that the brightness is not sufficient to cope with a compact high-pixel image sensor. The imaging lens in Example 5 provides high brightness with an F-value of 2.4 but its field of view of 67 degrees is not sufficient to meet the demand for a wide field of view. In order for the imaging lens described in Patent Literature 2 to achieve low-profileness, a wide field of view and high brightness, again the problem with difficulty in correction of aberrations in the peripheral area of an image must be solved.

The present invention has been made in view of the above problem, and an object of the present invention is to provide a compact high-resolution imaging lens composed of six constituent lenses which satisfies the demand for low-profileness, meets the demands for a low F-value and a wide field of view in a balanced manner and corrects various aberrations properly.

Here, "low-profile" means that total track length is less than 5 mm, the TTL-to-diagonal ratio is about 0.7; "low F-value" means brightness with an F-value of 2.3 or less; and "wide field of view" means a field of view of about 80 degrees or more. Here, regarding the TTL-to-diagonal ratio, the diagonal length of the effective imaging plane of the image sensor is equal to the diameter of an effective image circle which is twice the maximum image height, in which the maximum image height is the vertical height from an optical axis to the point where a light ray incident on the imaging lens at a maximum field of view enters the imaging plane.

Regarding the terminology used here, a convex or concave surface of a lens is defined as a lens surface whose paraxial portion (portion near the optical axis) is convex or concave, and a pole point is defined as an off-axial point on an aspheric surface at which a tangential plane intersects the optical axis perpendicularly. Total track length is defined as the distance on the optical axis from the object-side surface of the optical element nearest to the object to the image plane, when the thickness of an optical element not involved in convergence or divergence of light, such as an IR cut filter or cover glass, is air-converted.

According to an aspect of the present invention, there is provided an imaging lens to form an image of an object on a solid-state image sensor, which includes, in order from an object side to an image side: a first lens with positive refractive power having a convex surface on the object side; a second lens with negative refractive power as a meniscus lens having a concave surface on the image side; a third lens having a concave surface on the image side; a fourth lens; a fifth lens with positive refractive power having a convex surface on the image side; and a sixth lens with negative refractive power having a concave surface on each of the object side and image side.

The imaging lens according to the present invention includes, in order from the object side, a lens group with positive composite refractive power including the first lens, the second lens, and the third lens and a lens group with negative composite refractive power including the fourth lens, the fifth lens, and the sixth lens, making a so-called telephoto arrangement.

In the above configuration, the positive lens group including the first, second, and third lenses enables the imaging lens to be low-profile and offer a wide field of view and correct various aberrations properly. The first lens is a lens with positive refractive power having a convex surface on the object side which has strong positive refractive power to achieve the low-profileness of the imaging lens and a wide field of view. The second lens is a meniscus lens with negative refractive power having a concave surface on the image side, which properly corrects spherical aberrations and chromatic aberrations which occur on the first lens. The third lens has a concave surface on the image side and corrects axial chromatic aberrations, high-order spherical aberrations and coma aberrations, and field curvature.

The negative lens group including the fourth, fifth, and sixth lenses contributes to the low-profileness of the imaging lens and a wide field of view and properly corrects various aberrations. The fourth lens corrects axial chromatic aberrations, high-order spherical aberrations and coma aberrations, and field curvature. The fifth lens has a convex surface on the image side and has strong positive refractive power and its strong positive refractive power is appropriately balanced with the refractive power of the first lens so that the imaging lens is low-profile, offers a wide field of view and properly corrects astigmatism and field curvature. The sixth lens is a lens with negative refractive power having a concave surface on each of the object side and image side, which properly corrects spherical aberrations which occur on the fifth lens and corrects field curvature.

Preferably, in the imaging lens according to the present invention, an aperture stop is located on the object side of the first lens.

When the aperture stop is located on the object side of the first lens, the entrance pupil is remote from the image plane, thereby making it easy to control telecentricity.

Preferably, the imaging lens according to the present invention satisfies a conditional expression (1) below:

$$0.18 < AG16/\Sigma d < 0.3 \qquad (1)$$

where AG16 denotes the sum of air gaps on the optical axis between the first lens and the sixth lens, and $\Sigma d$ denotes the distance on the optical axis from the object-side surface of the first lens to the image-side surface of the sixth lens.

The conditional expression (1) defines an appropriate range for the ratio of the sum of air gaps on the optical axis between the first lens and the sixth lens to the distance on the optical axis from the object-side surface of the first lens to the image-side surface of the sixth lens, and indicates a condition to achieve a short total track length. If the value is above the upper limit of the conditional expression (1), the ratio of air gaps in the imaging lens system would be too large to shorten the total track length. On the other hand, if the value is below the lower limit of the conditional expression (1), undesirably the air gaps between constituent lenses would be too narrow, increasing the risk that the constituent lenses may touch each other during the assembling process.

Preferably, the imaging lens according to the present invention satisfies a conditional expression (2) below:

$$20 < vd3 - vd4 < 40 \qquad (2)$$

where vd3 denotes the Abbe number of the third lens at d-ray, and vd4 denotes the Abbe number of the fourth lens at d-ray.

The conditional expression (2) defines an appropriate range for the difference in Abbe number at d-ray between the third lens and the fourth lens, and indicates a condition to correct chromatic aberrations properly. When a material which satisfies the conditional expression (2) is adopted, chromatic aberrations are corrected properly.

Preferably, in the imaging lens according to the present invention, the fifth lens has an aspheric surface with a pole point off the optical axis on the object-side surface.

Since the fifth lens has an aspheric surface with a pole point off the optical axis on the object-side surface, field curvature and distortion are corrected more effectively.

Preferably, the imaging lens according to the present invention satisfies a conditional expression (3) below:

$$0.2 < Ph51/ih < 0.9 \qquad (3)$$

where Ph51 denotes the vertical height of the pole point on the object-side surface of the fifth lens from the optical axis, and ih denotes maximum image height.

The conditional expression (3) defines an appropriate range for the ratio of the vertical height of the pole point on the object-side surface of the fifth lens from the optical axis to maximum image height (image size). When the conditional expression (3) is satisfied, off-axial astigmatism and field curvature which increase as the imaging lens is more low-profile and offers a wider field of view are corrected properly.

Preferably, the imaging lens according to the present invention satisfies a conditional expression (4) below:

$$(f5 + |f6|)/f < 1.3 \qquad (4)$$

where f denotes the focal length of the overall optical system of the imaging lens, f5 denotes the focal length of the fifth lens, and f6 denotes the focal length of the sixth lens.

The conditional expression (4) defines an appropriate range for the ratio of the sum of the focal length of the fifth lens and the focal length of the sixth lens to the focal length of the overall optical system of the imaging lens. When the conditional expression (4) is satisfied, the total track length is shortened more appropriately.

Preferably, the imaging lens according to the present invention satisfies a conditional expression (5) below:

$$0.5 < f1/f < 1.5 \qquad (5)$$

where f denotes the focal length of the overall optical system of the imaging lens, and f1 denotes the focal length of the first lens.

The conditional expression (5) defines an appropriate range for the ratio of the focal length of the first lens to the focal length of the overall optical system of the imaging lens, and indicates a condition to suppress spherical aberrations and achieve low-profileness and a wide field of view. If the value is above the upper limit of the conditional expression (5), the positive refractive power of the first lens would be too weak to achieve the low-profileness of the imaging lens and a wide field of view, though it is advantageous in suppressing spherical aberrations. On the other hand, if the value is below the lower limit of the conditional expression (5), the positive refractive power of the first lens would be too strong and increase spherical aberrations, though it is advantageous in achieving the low-profileness of the imaging lens and a wide field of view.

Preferably, the imaging lens according to the present invention satisfies a conditional expression (6) below:

$$1.5 < (r3+r4)/(r3-r4) < 4.5 \quad (6)$$

where r3 denotes the curvature radius of the object-side surface of the second lens, and r4 denotes the curvature radius of the image-side surface of the second lens.

The conditional expression (6) defines the paraxial shape of the second lens, and indicates a condition to correct various aberrations properly. When the refractive power of the image-side surface of the second lens is increased within the range defined by the conditional expression (6), chromatic aberrations which occur on the first lens are corrected, and coma aberrations, field curvature and astigmatism are also corrected properly.

Preferably, in the imaging lens according to the present invention, the third lens has positive refractive power, and the fourth lens has a concave surface on the object side and has negative refractive power.

The third lens having positive refractive power contributes to the low-profileness of the imaging lens and corrects axial chromatic aberrations, high-order spherical aberrations and coma aberrations, and field curvature. Also, the fourth lens is a lens with negative refractive power having a concave surface on the object side, which suppresses the angle of light rays incident on that surface and properly suppresses coma aberrations and high-order spherical aberrations which occur on the third lens.

Preferably, in the imaging lens according to the present invention, the second lens, the fourth lens, and the sixth lens satisfy a conditional expression (7) below:

$$P4 < P2 < P6 \quad (7)$$

where P2 denotes the refractive power of the second lens, P4 denotes the refractive power of the fourth lens, and P6 denotes the refractive power of the sixth lens and the refractive power of each lens is defined as the reciprocal of the focal length of each lens.

The conditional expression (7) defines the relation in the magnitude of refractive power among the second, fourth, and sixth lenses which have negative refractive power. The fourth lens, which is located near the center of the imaging lens and has the weakest refractive power, mainly corrects chromatic aberrations, high-order spherical aberrations and coma aberrations, and field curvature. The second lens, which is located near the object and has stronger refractive power than the fourth lens, corrects spherical aberrations and chromatic aberrations which occur on the first lens. The sixth lens, which is located nearest to the image plane and has the strongest refractive power, corrects spherical aberrations and field curvature. When the conditional expression (7) is satisfied, the total track length is shortened and aberrations are corrected properly.

Preferably, in the imaging lens according to the present invention, the first lens, the third lens, and the fifth lens have positive refractive power and satisfy a conditional expression (8) below:

$$P3 < P1 < P5 \quad (8)$$

where P1 denotes the refractive power of the first lens, P3 denotes the refractive power of the third lens and P5 denotes the refractive power of the fifth lens, and the refractive power of each lens is defined as the reciprocal of the focal length of each lens.

The conditional expression (8) defines the relation in the magnitude of refractive power among the first, third, and fifth lenses which have positive refractive power. The third lens, which is located near the center of the imaging lens and has the weakest refractive power, mainly corrects chromatic aberrations, high-order spherical aberrations and coma aberrations, and field curvature. The first lens, which is located near the object and has stronger refractive power than the third lens, suppresses spherical aberrations and contributes to the low-profileness of the imaging lens and a wide field of view. By appropriately balancing positive refractive power between the fifth lens and the first lens, the fifth lens, which is located near the image plane and has the strongest refractive power, contributes to the low-profileness of the imaging lens and a wide field of view and corrects astigmatism and field curvature. When the conditional expression (8) is satisfied, the low-profileness of the imaging lens and a wide field of view are achieved and various aberrations are corrected properly.

When the conditional expression (7) and conditional expression (8) are both satisfied, correction of aberrations and shortening of the total track length can be achieved appropriately.

Preferably, in the imaging lens according to the present invention, the sixth lens has an aspheric surface with a pole point off the optical axis on the image-side surface.

When the sixth lens has a pole point off the optical axis on the image-side surface, correction of field curvature and distortion and control of the angle of a chief ray incident on the image sensor are performed more effectively.

Preferably, the imaging lens according to the present invention satisfies a conditional expression (9) below:

$$20 < vd1 - vd2 < 40 \quad (9)$$

where vd1 denotes the Abbe number of the first lens at d-ray and vd2 denotes the Abbe number of the second lens at d-ray.

The conditional expression (9) defines an appropriate range for the difference in Abbe number at d-ray between the first lens and the second lens, and indicates a condition to correct chromatic aberrations properly. When a material which satisfies the conditional expression (9) is adopted, chromatic aberrations are corrected properly.

Preferably, the imaging lens according to the present invention satisfies conditional expressions (10) and (11) below:

$$50 < vd5 < 70 \quad (10)$$

$$50 < vd6 < 70 \quad (11)$$

where vd5 denotes the Abbe number of the fifth lens at d-ray and vd6 denotes the Abbe number of the sixth lens at d-ray.

The conditional expression (10) defines an appropriate range for the Abbe number of the fifth lens at d-ray. When a low-dispersion material which satisfies the conditional expression (10) is adopted for the fifth lens which has positive refractive power, chromatic aberrations are corrected properly. The conditional expression (11) defines an appropriate range for the Abbe number of the sixth lens at d-ray. If the value is above the upper limit of the conditional expression (11), it would be difficult to correct axial chromatic aberrations. If the value is below the lower limit of the conditional expression (11), it would be easier to correct axial chromatic aberrations but it would be difficult to correct off-axial chromatic aberrations. When a material which satisfies the conditional expression (11) is adopted for the sixth lens, axial and off-axial chromatic aberrations are corrected in a balanced manner.

Preferably, the imaging lens according to the present invention satisfies a conditional expression (12) below:

$$0.75 < D5/D6 < 1.50 \quad (12)$$

where D5 denotes the thickness of the fifth lens on the optical axis and D6 denotes the thickness of the sixth lens on the optical axis.

The conditional expression (12) defines an appropriate range for the ratio of the thickness of the fifth lens on the optical axis to that of the sixth lens on the optical axis. The fifth lens and the sixth lens, both located near the image plane, each have a relatively large effective diameter. When their thicknesses are appropriately balanced within the range defined by the conditional expression (12), stable formability is ensured.

Preferably, the imaging lens according to the present invention satisfies a conditional expression (13) below:

$$0.35 < (T5/f) \times 100 < 3.00 \quad (13)$$

where T5 denotes the distance on the optical axis from the image-side surface of the fifth lens to the object-side surface of the sixth lens and f denotes the focal length of the overall optical system of the imaging lens.

The conditional expression (13) defines an appropriate range for the distance on the optical axis from the image-side surface of the fifth lens to the object-side surface of the sixth lens. If the value is above the upper limit of the conditional expression (13), the air gap between the fifth lens and the sixth lens would be too wide to make the imaging lens low-profile and also distortion and field curvature would increase, making it impossible to deliver high optical performance. On the other hand, if the value is below the lower limit of the conditional expression (13), the air gap between the fifth lens and the sixth lens would be too narrow, increasing the risk that these lenses may touch each other during the assembling process.

Preferably, the imaging lens according to the present invention satisfies a conditional expression (14) below:

$$0.6 < |r7|/f < 17.0 \quad (14)$$

where f denotes the focal length of the overall optical system of the imaging lens and r7 denotes the curvature radius of the object-side surface of the fourth lens.

The conditional expression (14) defines an appropriate range for the ratio of the curvature radius of the object-side surface of the fourth lens to the focal length of the overall optical system of the imaging lens. If the value is above the upper limit of the conditional expression (14), the refractive power of the object-side surface of the fourth lens would be too weak and the angle of off-axial light rays incident on that surface would increase, making it difficult to correct off-axial spherical aberrations, coma aberrations and field curvature. On the other hand, if the value is below the lower limit of the conditional expression (14), the refractive power of the object-side surface of the fourth lens would be too strong and aberrations in the peripheral portion of the lens surface would be corrected excessively, making it difficult to correct high-order spherical aberrations and coma aberrations, and field curvature.

Preferably, the imaging lens according to the present invention satisfies a conditional expression (15) below:

$$0.45 < E5/D5 < 1.20 \quad (15)$$

where E5 denotes the edge thickness of the fifth lens in the maximum effective diameter and D5 denotes the thickness of the fifth lens on the optical axis.

The conditional expression (15) defines an appropriate range for the ratio of the edge thickness of the fifth lens in the maximum effective diameter to the thickness of the fifth lens on the optical axis. In order to make a thin small lens by injection molding, from the viewpoint of flowability during the molding process, it is desirable that the difference in thickness between the center and edge of the lens be small. When the conditional expression (15) is satisfied, the influence of low flowability on the surface accuracy, sink marks and the like can be prevented, leading to reduction in the ratio of molding defects and to higher mass productivity.

Preferably, the imaging lens according to the present invention satisfies a conditional expression (16) below:

$$0.6 < f12/f < 2.0 \quad (16)$$

where f denotes the focal length of the overall optical system of the imaging lens and f12 denotes the composite focal length of the first lens and the second lens.

The conditional expression (16) defines an appropriate range for the ratio of the composite focal length of the first lens and the second lens to the focal length of the overall optical system of the imaging lens. If the value is above the upper limit of the conditional expression (16), the composite focal length of the first lens and the second lens would be too long to shorten the total track length. On the other hand, if the value is below the lower limit of the conditional expression (16), the composite focal length of the first lens and the second lens would be too short and chromatic aberrations would increase, making it difficult to ensure high optical performance.

Preferably, the imaging lens according to the present invention satisfies a conditional expression (17) below:

$$0.80 < ih/f < 1.0 \quad (17)$$

where f denotes the focal length of the overall optical system of the imaging lens and ih denotes maximum image height.

The conditional expression (17) defines an appropriate range for the ratio of maximum image height to the focal length of the overall optical system of the imaging lens, which represents the field of view. If the value is above the upper limit of the conditional expression (17), the field of view would be too wide to correct aberrations properly, which would make it difficult to correct various aberrations, particularly in the peripheral area of the image, leading to deterioration in optical performance. On the other hand, if the value is below the lower limit of the conditional expression (17), it would be easy to correct aberrations and advantageous in increasing the optical performance but it would be difficult to achieve a wide field of view.

Preferably, the imaging lens according to the present invention satisfies a conditional expression (18) below:

$$TTL/2ih < 1.0 \quad (18)$$

where TTL denotes total track length and ih denotes maximum image height.

The conditional expression (18) defines an appropriate range for the TTL-to-diagonal ratio. If the value is above the upper limit of the conditional expression (18), the total track length would be too long to meet the demand for low-profileness.

According to the present invention, there is provided a compact high-resolution imaging lens which satisfies the demand for low-profileness, meets the demands for a low F-value and a wide field of view in a balanced manner and corrects various aberrations properly.

DETAILED DESCRIPTION OF THE PREFERRED EMBODIMENTS

Hereinafter, the preferred embodiment of the present invention will be described in detail referring to the accompanying drawings.

FIGS. 1, 3, 5, 7, 9, 11, 13, 15, 17, 19, 21, and 23 are schematic views showing the general configurations of the imaging lenses in Examples 1 to 12 according to this embodiment, respectively. Since all these examples have the same basic lens configuration, the general configuration of an imaging lens according to this embodiment is explained below mainly referring to the schematic view of Example 1.

Figure 1:
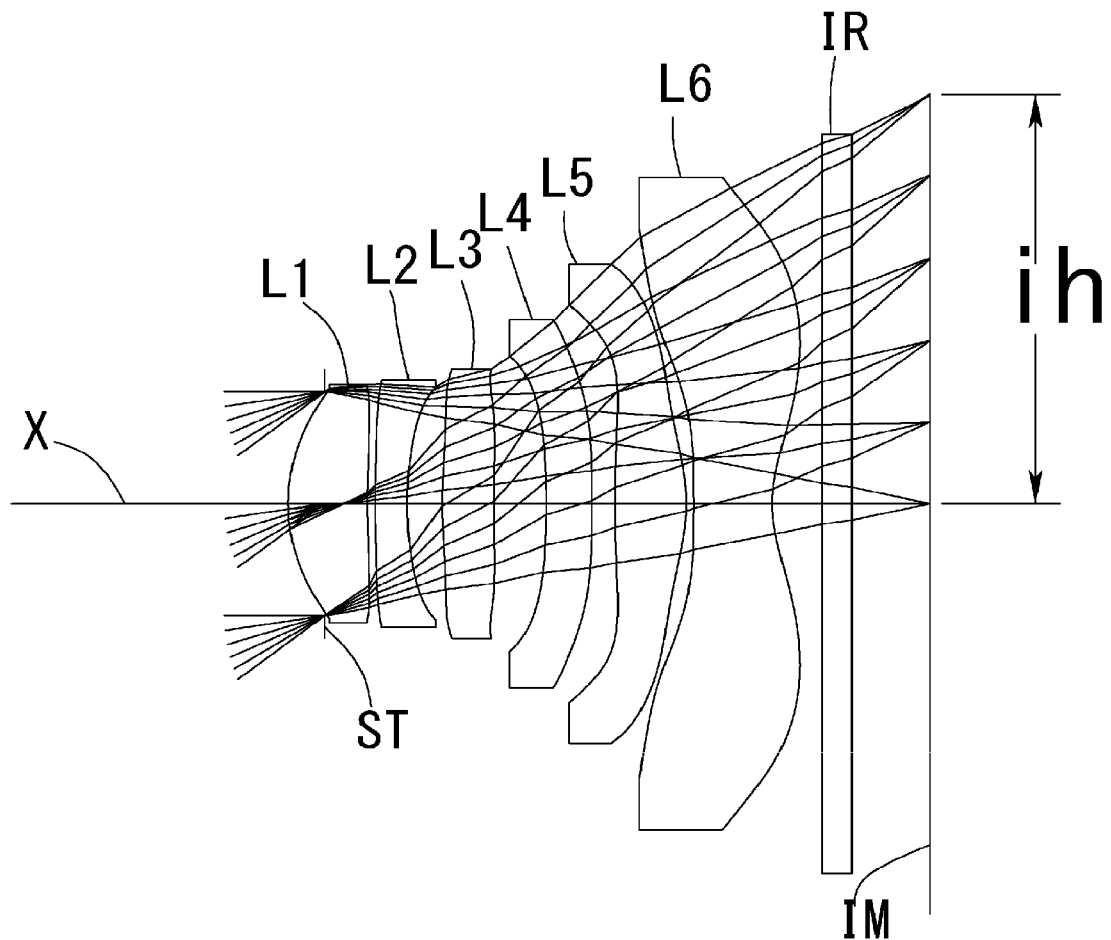
FIG. 1 is a schematic view showing the general configuration of an imaging lens in Example 1 according to the present invention.

As shown in FIG. 1, the imaging lens according to this embodiment includes, in order from an object side to an image side, a first lens L1 with positive refractive power, a second lens L2 with negative refractive power, a third lens L3 with positive refractive power, a fourth lens L4 with negative refractive power, a fifth lens L5 with positive refractive power, and a sixth lens L6 with negative refractive power. An aperture stop ST is located in front of the first lens L1 with positive refractive power.

A filter IR such as an infrared cut filter or cover glass is located between the sixth lens L6 and an image plane IM. The filter IR is omissible. Since an imaging position in the optical system differs depending on the thickness of the filter IR, in the present invention an axial distance is defined as an axial distance in which the thickness of an optical element not involved in convergence or divergence of light, such as an IR cut filter or cover glass, is air-converted.

The imaging lens, composed of six constituent lenses, includes a lens group with positive composite refractive power, including the first lens L1, the second lens L2, and the third lens L3, and a lens group with negative composite refractive power, including the fourth lens L4, the fifth lens L5, and the sixth lens L6, making a telephoto arrangement which is advantageous in shortening the total track length.

In the imaging lens composed of six constituent lenses, the aperture stop ST is located between the apex and end edge of the object-side surface of the first lens L1, so that the entrance pupil is remote from the image plane IM, making it easy to control telecentricity.

The first lens L1 is a lens with positive refractive power having a convex surface on the object side. The image-side surface of the first lens L1 has a concave shape with a larger curvature radius than the curvature radius of the object-side surface to the extent that the refractive power does not become too low and spherical aberrations do not increase, so that the imaging lens is low-profile and offers a wide field of view. Alternatively, the first lens L1 may have a biconvex shape. In that case, by appropriately distributing the positive refractive power between the object-side surface and the image-side surface, spherical aberrations are suppressed and the positive refractive power is increased, so that the imaging lens is more low-profile and offers a wider field of view.

The second lens L2 is a lens with negative refractive power having a concave surface on the image side, which properly corrects spherical aberrations and chromatic aberrations which occur on the first lens L1.

The third lens L3 has a meniscus shape with a concave surface on the image side and has positive refractive power. Among the constituent lenses of the imaging lens, it has weak refractive power and contributes to the low-profileness of the imaging lens and corrects axial chromatic aberrations. The aspheric surfaces on the both sides correct high-order spherical aberrations, coma aberrations, and field curvature.

The fourth lens L4 is a meniscus lens with negative refractive power having a convex surface on the image side, which corrects axial chromatic aberrations and high-order spherical aberrations and coma aberrations, and field curvature. Alternatively, the fourth lens L4 may have a biconcave shape as in Examples 4, 10, and 12. In that case, spherical aberrations and axial chromatic aberrations are corrected more properly. Also, the fourth lens L4 may have a meniscus shape with a convex surface on the object side. In that case, field curvature is corrected more properly. In Examples 5 to 8, the fourth lens L4 has a meniscus shape with a convex surface on the object side.

The fifth lens L5 is a biconvex double-sided aspheric lens with strong positive refractive power having a convex surface on each of the object side and image side, contributing to compactness of the imaging lens. It has a pole point off an optical axis X on the aspheric object-side surface and properly corrects astigmatism and field curvature. Alternatively, the fifth lens L5 may have a meniscus shape with a convex surface on the image side as in Example 7.

The sixth lens L6 is a biconcave lens with negative refractive power having a concave surface on each of the object side and image side. It has an aspheric surface on both sides and the aspheric image-side surface has a pole point off the optical axis X. These aspheric surfaces correct spherical aberrations which occur on the fifth lens L5, correct field curvature and control the angle of a chief ray incident on the image sensor within an appropriate range.

When all the constituent lenses of the imaging lens according to this embodiment are made of plastic material, the manufacturing process is easier and the imaging lens can be mass-produced at low cost. Both surfaces of each lens have appropriate aspheric shapes to correct various aberrations more properly.

The lens material is not limited to plastic material. The lens performance can also be further enhanced by using glass material. Although it is desirable that all the lens surfaces have aspheric shapes, a spherical surface which is easy to make may be adopted depending on the required performance.

When the imaging lens according to this embodiment satisfies conditional expressions (1) to (18) below, it brings about advantageous effects:

$$0.18 < AG16/\Sigma d < 0.3 \quad (1)$$

$$20 < vd3 - vd4 < 40 \quad (2)$$

$$0.2 < Ph51/ih < 0.9 \quad (3)$$

$$(f5 + |f6|)/f < 1.3 \quad (4)$$

$$0.5 < f1/f < 1.5 \quad (5)$$

$$1.5 < (r3 + r4)/(r3 - r4) < 4.5 \quad (6)$$

$$P4 < P2 < P6 \quad (7)$$

$$P3 < P1 < P5 \quad (8)$$

$$20 < vd1 - vd2 < 40 \quad (9)$$

$$50 < vd5 < 70 \quad (10)$$

$$50 < vd6 < 70 \quad (11)$$

$$0.75 < D5/D6 < 1.50 \quad (12)$$

$$0.35 < (T5/f) \times 100 < 3.00 \quad (13)$$

$$0.6 < |r7|/f < 17.0 \quad (14)$$

$$0.45 < E5/D5 < 1.20 \quad (15)$$

$$0.6 < f12/f < 2.0 \quad (16)$$

$$0.80 < ih/f < 1.0 \quad (17)$$

$$TTL/2ih < 1.0 \quad (18)$$

where

AG16: sum of air gaps on the optical axis X from the first lens L1 to the sixth lens L6

$\Sigma d$: distance on the optical axis X from the object-side surface of the first lens L1 to the image-side surface of the sixth lens L6

Ph51: vertical height of the pole point on the object-side surface of the fifth lens L5 from the optical axis X ih: maximum image height f: focal length of the overall optical system of the imaging lens f1: focal length of the first lens L1 f5: focal length of the fifth lens L5 f6: focal length of the sixth lens L6 f12: composite focal length of the first lens L1 and the second lens L2 r3: curvature radius of the object-side surface of the second lens L2 r4: curvature radius of the image-side surface of the second lens L2

P1: refractive power of the first lens L1

P2: refractive power of the second lens L2

P3: refractive power of the third lens L3

P4: refractive power of the fourth lens L4

P5: refractive power of the fifth lens L5

P6: refractive power of the sixth lens L6 vd1: Abbe number of the first lens L1 at d-ray vd2: Abbe number of the second lens L2 at d-ray vd3: Abbe number of the third lens L3 at d-ray vd4: Abbe number of the fourth lens L4 at d-ray vd5: Abbe number of the fifth lens L5 at d-ray vd6: Abbe number of the sixth lens L6 at d-ray D5: thickness of the fifth lens L5 on the optical axis X D6: thickness of the sixth lens L6 on the optical axis X T5: distance on the optical axis X from the image-side surface of the fifth lens L5 to the object-side surface of the sixth lens L6 r7: curvature radius of the object-side surface of the fourth lens L4

E5: edge thickness of the fifth lens L5 in the maximum effective diameter

TTL: total track length.

When the imaging lens according to this embodiment satisfies conditional expressions (1a) to (6a) and (9a) to (18a) below, it brings about more advantageous effects:

$0.21 < AG16/\Sigma d < 0.3$ (1a)

$25 < vd3 - vd4 < 40$ (2a)

$0.2 < Ph51/ih < 0.7$ (3a)

$(f5 + |f6|)/f < 1.22$ (4a)

$0.6 < f1/f < 1.2$ (5a)

$1.9 < (r3 + r4)/(r3 - r4) < 3.7$ (6a)

$25 < vd1 - vd2 < 40$ (9a)

$50 < vd5 < 65$ (10a)

$50 < vd6 < 65$ (11a)

$0.75 < D5/D6 < 1.30$ (12a)

$0.42 < (T5/f) \times 100 < 3.00$ (13a)

$1.0 < |r7|/f < 16.0$ (14a)

$0.45 < E5/D5 < 1.20$ (15a)

$0.8 < f12/f < 1.6$ (16a)

$0.80 < ih/f < 0.9$ (17a)

$TTL/2ih < 0.8$. (18a)

The signs in the above conditional expressions have the same meanings as those in the preceding paragraph.

When the imaging lens according to this embodiment satisfies conditional expressions (1b) to (6b) and (9b) to (18b) below, it brings about particularly advantageous effects:

$0.24 \leq AG16/\Sigma d \leq 0.27$ (1b)

$25 \leq vd3 - vd4 \leq 38$ (2b)

$0.23 \leq Ph51/ih \leq 0.31$ (3b)

$(f5 + |f6|)/f \leq 1.19$ (4b)

$0.70 < f1/f \leq 1.2$ (5b)

$2.13 \leq (r3 + r4)/(r3 - r4) \leq 3.29$ (6b)

$25 \leq vd1 - vd2 \leq 38$ (9b)

$50 \leq vd5 \leq 60$ (10b)

$50 \leq vd6 \leq 60$ (11b)

$0.86 \leq D5/D6 \leq 1.12$ (12b)

$0.47 \leq (T5/f) \times 100 2.66$ (13b)

$1.18 \leq |r7|/f \leq 14.34$ (14b)

$0.50 \leq E5/D5 \leq 0.6$ (15b)

$1.15 \leq f12/f \leq 1.38$ (16b)

$0.80 \leq ih/f \leq 0.85$ (17b)

$TTL/2ih \leq 0.75$. (18b)

The signs in the above conditional expressions have the same meanings as those in the paragraph before the preceding paragraph.

In this embodiment, the aspheric shapes of the lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, examples of the imaging lens according to this embodiment will be explained. In each example, f denotes the focal length of the overall optical system of the imaging lens, Fno denotes an F-number, ω denotes a half field of view, and ih denotes maximum image height. i denotes a surface number counted from the object side, r denotes a curvature radius, d denotes the distance on the optical axis between lens surfaces (axial surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

Example 1

The basic lens data of Example 1 is shown below in Table 1.

TABLE 1

Numerical Data Example 1
Unit mm f = 3.86
Fno = 2.24
ω (°) = 38.8
ih = 3.14
TTL = 4.43

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.255 | | |

TABLE 1-continued

Numerical Data Example 1
Unit mm

| | | | | |
|---|---|---|---|---|
| 2* | 1.441 | 0.555 | 1.5443 | 55.86 |
| 3* | 5.904 | 0.055 | | |
| 4* | 5.470 | 0.223 | 1.6391 | 23.25 |
| 5* | 2.486 | 0.248 | | |
| 6* | 4.087 | 0.363 | 1.5348 | 55.66 |
| 7* | 10.337 | 0.366 | | |
| 8* | −8.933 | 0.320 | 1.6391 | 23.25 |
| 9* | −165.069 | 0.163 | | |
| 10* | 11.888 | 0.500 | 1.5348 | 55.66 |
| 11* | −1.406 | 0.050 | | |
| 12* | −19.374 | 0.550 | 1.5348 | 55.66 |
| 13* | 1.094 | 0.300 | | |
| 14 | Infinity | 0.210 | 1.5168 | 64.20 |
| 15 | Infinity | 0.599 | | |
| Image Plane | Infinity | | | |

Constituent Lens Data

| Lens | Start Surface | Focal Length | |
|---|---|---|---|
| 1 | 2 | 3.35 | f12 = 5.18 |
| 2 | 4 | −7.34 | E5 = 0.29 |
| 3 | 6 | 12.39 | Ph51 = 0.79 |
| 4 | 8 | −14.79 | |
| 5 | 10 | 2.38 | |
| 6 | 12 | −1.92 | |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −8.069E−03 | −3.191E−01 | −4.654E−01 | −2.766E−01 | −2.188E−01 | −1.067E−01 |
| A6 | 4.412E−02 | 7.599E−01 | 1.308E+00 | 8.960E−01 | 2.427E−01 | −6.075E−02 |
| A8 | −1.862E−01 | −8.703E−01 | −1.556E+00 | −1.115E+00 | −3.744E−01 | 1.274E−01 |
| A10 | 2.877E−01 | 3.098E−01 | 7.290E−01 | 7.933E−01 | 4.795E−01 | −1.108E−01 |
| A12 | −1.942E−01 | 0.000E+00 | −4.038E−02 | −2.012E−01 | −1.951E−01 | 7.600E−02 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −1.005E+01 | 0.000E+00 | −7.747E+00 |
| A4 | −8.926E−02 | −1.969E−01 | 1.147E−03 | 9.956E−02 | −1.444E−01 | −1.173E−01 |
| A6 | 2.208E−02 | 2.461E−01 | −2.455E−02 | −2.506E−02 | 3.814E−02 | 6.785E−02 |
| A8 | −2.656E−02 | −4.107E−01 | −2.126E−02 | −1.478E−02 | 2.196E−02 | −3.201E−02 |
| A10 | −3.513E−02 | 4.723E−01 | 7.463E−03 | −6.263E−03 | −1.330E−02 | 9.913E−03 |
| A12 | 6.935E−02 | −2.971E−01 | 0.000E+00 | 1.068E−02 | 2.524E−03 | −1.869E−03 |
| A14 | −3.457E−02 | 9.502E−02 | 0.000E+00 | −3.459E−03 | −1.657E−04 | 1.918E−04 |
| A16 | 0.000E+00 | −1.227E−02 | 0.000E+00 | 3.508E−04 | −2.513E−07 | −8.111E−06 |

As shown in Table 13, the imaging lens in Example 1 satisfies conditional expressions (1) to (18).

Figure 2:
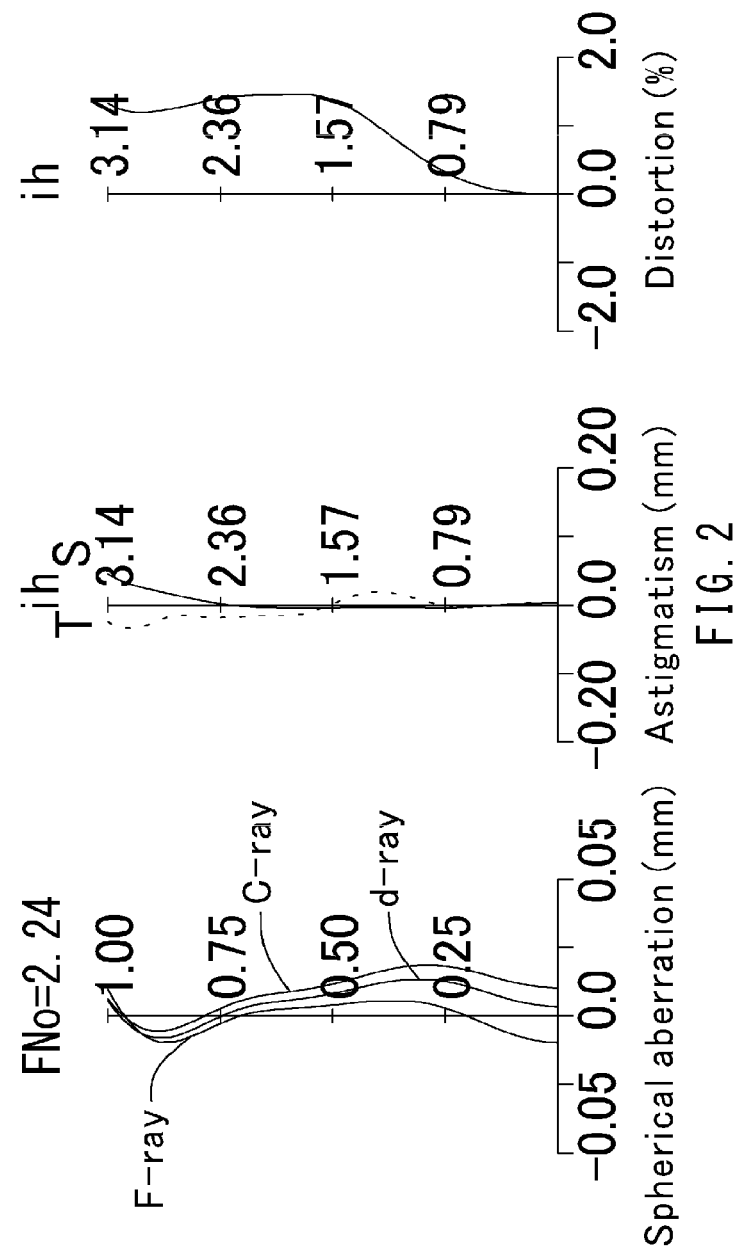
FIG. 2 shows spherical aberration, astigmatism, and distortion of the imaging lens in Example 1 according to the present invention.
Figure 3:
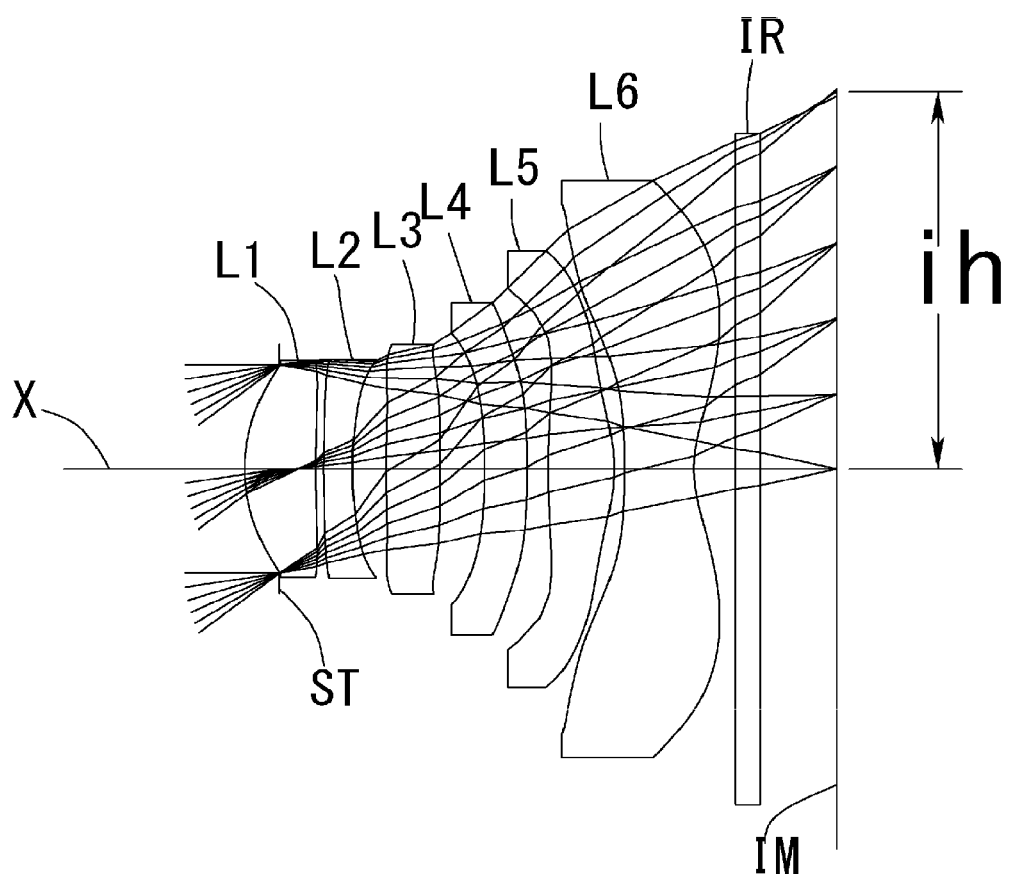
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, 12, 14, 16, 18, 20, 22, and 24). As shown in FIG. 2, each aberration is corrected properly.

Example 2

The basic lens data of Example 2 is shown below in Table 2.

TABLE 2

Numerical Data Example 2
Unit mm f = 4.27
Fno = 2.21
ω (°) = 39.0
ih = 3.50
TTL = 4.95

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.297 | | |
| 2* | 1.629 | 0.600 | 1.5443 | 55.86 |
| 3* | 6.334 | 0.071 | | |
| 4* | 6.327 | 0.241 | 1.6503 | 21.54 |
| 5* | 3.137 | 0.283 | | |
| 6* | 6.186 | 0.457 | 1.5348 | 55.66 |
| 7* | 25.405 | 0.381 | | |
| 8* | −6.854 | 0.356 | 1.6391 | 23.25 |
| 9* | −22.061 | 0.182 | | |
| 10* | 10.585 | 0.558 | 1.5348 | 55.66 |
| 11* | −1.537 | 0.087 | | |
| 12* | −11.818 | 0.588 | 1.5348 | 55.66 |
| 13* | 1.222 | 0.350 | | |
| 14 | Infinity | 0.210 | 1.5168 | 64.20 |
| 15 | Infinity | 0.657 | | |
| Image Plane | Infinity | | | |

Constituent Lens Data

| Lens | Start Surface | Focal Length | | |
|---|---|---|---|---|
| 1 | 2 | 3.86 | f12 = 5.53 | |
| 2 | 4 | −9.86 | E5 = 0.32 | |
| 3 | 6 | 15.16 | Ph51 = 0.93 | |
| 4 | 8 | −15.70 | | |
| 5 | 10 | 2.55 | | |
| 6 | 12 | −2.04 | | |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −7.815E−03 | −2.319E−01 | −3.345E−01 | −2.022E−01 | −1.591E−01 | −8.082E−02 |
| A6 | 2.576E−02 | 4.416E−01 | 7.644E−01 | 5.221E−01 | 1.377E−01 | −3.405E−02 |
| A8 | −8.765E−02 | −4.096E−01 | −7.303E−01 | −5.230E−01 | −1.759E−01 | 6.154E−02 |
| A10 | 1.083E−01 | 1.188E−01 | 2.759E−01 | 2.994E−01 | 1.874E−01 | −4.191E−02 |
| A12 | −5.921E−02 | 0.000E+00 | −1.226E−02 | −6.143E−02 | −5.946E−02 | 2.316E−02 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −9.875E+00 | 0.000E+00 | −7.946E+00 |
| A4 | −6.385E−02 | −1.386E−01 | 2.334E−03 | 7.014E−02 | −1.041E−01 | −8.367E−02 |
| A6 | 1.468E−02 | 1.447E−01 | −1.531E−02 | −1.450E−02 | 2.231E−02 | 3.971E−02 |
| A8 | −9.821E−03 | −1.928E−01 | −9.872E−03 | −6.908E−03 | 1.032E−02 | −1.508E−02 |
| A10 | −1.241E−02 | 1.788E−01 | 2.639E−03 | −2.369E−03 | −5.034E−03 | 3.748E−03 |
| A12 | 2.115E−02 | −9.057E−02 | 0.000E+00 | 3.256E−03 | 7.695E−04 | −5.700E−04 |
| A14 | −8.496E−03 | 2.335E−02 | 0.000E+00 | −8.499E−04 | −4.072E−05 | 4.715E−05 |
| A16 | 0.000E+00 | −2.443E−03 | 0.000E+00 | 6.955E−05 | −4.526E−08 | −1.601E−06 |

As shown in Table 13, the imaging lens in Example 2 satisfies conditional expressions (1) to (18).

Figure 4:
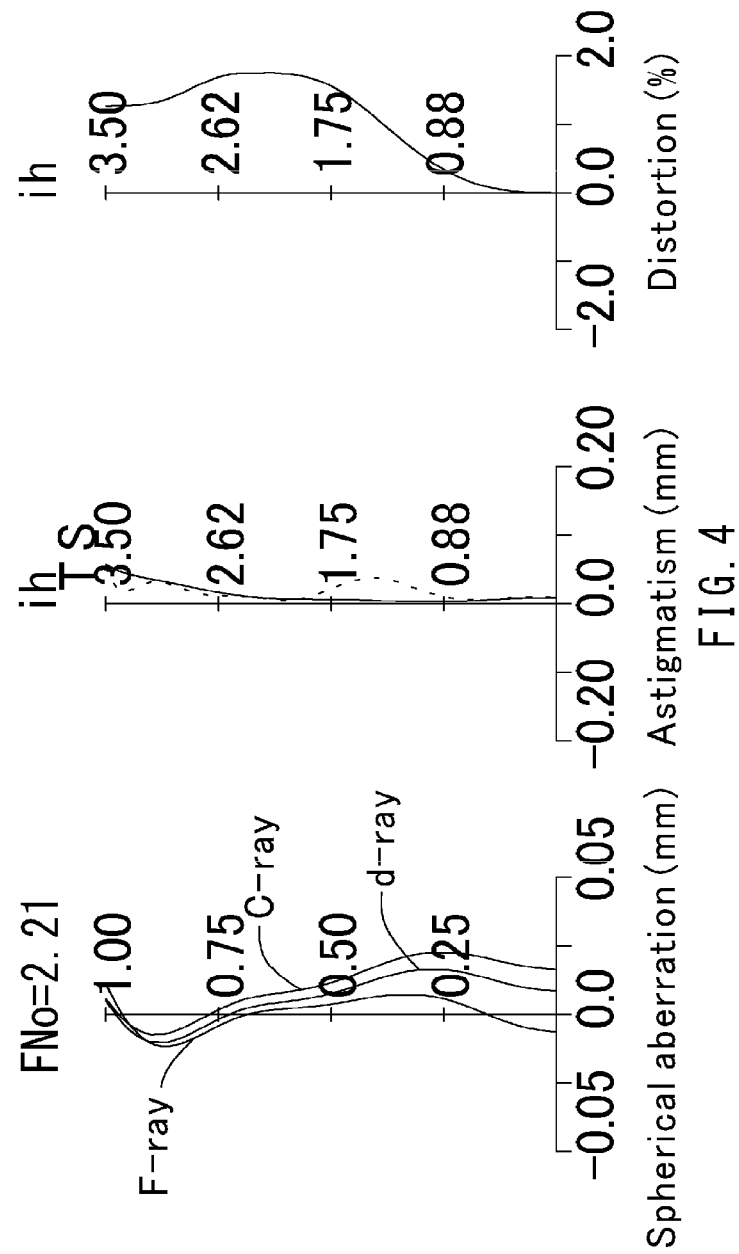
FIG. 4 shows spherical aberration, astigmatism, and distortion of the imaging lens in Example 2 according to the present invention.
Figure 5:
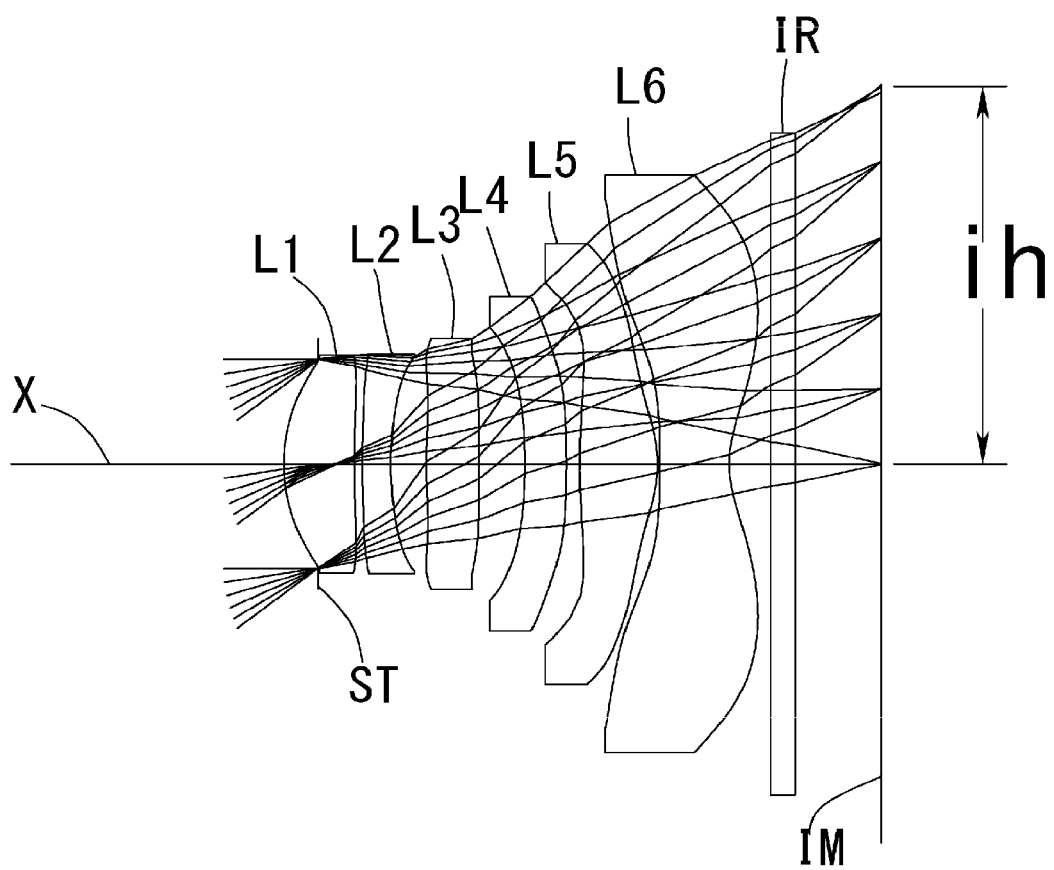
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected properly.

Example 3

The basic lens data of Example 3 is shown below in Table 3.

TABLE 3

Numerical Data Example 3
Unit mm f = 4.27
Fno = 2.20
ω (°) = 39.1
ih = 3.50
TTL = 5.00

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.292 | | |
| 2* | 1.644 | 0.597 | 1.5443 | 55.86 |
| 3* | 6.665 | 0.070 | | |
| 4* | 5.617 | 0.240 | 1.6503 | 21.54 |
| 5* | 3.000 | 0.302 | | |
| 6* | 6.642 | 0.443 | 1.5348 | 55.66 |
| 7* | 19.847 | 0.391 | | |
| 8* | −5.479 | 0.348 | 1.6391 | 23.25 |
| 9* | −24.217 | 0.115 | | |
| 10* | 8.727 | 0.658 | 1.5348 | 55.66 |
| 11* | −1.193 | 0.020 | | |
| 12* | −14.370 | 0.586 | 1.5348 | 55.66 |
| 13* | 0.998 | 0.350 | | |
| 14 | Infinity | 0.210 | 1.5168 | 64.20 |
| 15 | Infinity | 0.739 | | |
| Image Plane | Infinity | | | |

Constituent Lens Data

| Lens | Start Surface | Focal Length | | |
|---|---|---|---|---|
| 1 | 2 | 3.85 | f12 = 5.40 | |
| 2 | 4 | −10.27 | E5 = 0.35 | |
| 3 | 6 | 18.45 | Ph51 = 0.95 | |
| 4 | 8 | −11.16 | | |
| 5 | 10 | 2.01 | | |
| 6 | 12 | −1.72 | | |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −8.188E−03 | −2.310E−01 | −3.349E−01 | −2.019E−01 | −1.631E−01 | −8.677E−02 |
| A6 | 2.580E−02 | 4.417E−01 | 7.641E−01 | 5.213E−01 | 1.347E−01 | −3.464E−02 |
| A8 | −8.768E−02 | −4.102E−01 | −7.308E−01 | −5.256E−01 | −1.761E−01 | 6.170E−02 |
| A10 | 1.079E−01 | 1.185E−01 | 2.754E−01 | 3.002E−01 | 1.891E−01 | −4.243E−02 |
| A12 | −5.916E−02 | 0.000E+00 | −1.219E−02 | −6.153E−02 | −5.940E−02 | 2.314E−02 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −7.972E+00 | 0.000E+00 | −7.737E+00 |
| A4 | −5.250E−02 | −1.437E−01 | −3.447E−03 | 7.333E−02 | −1.014E−01 | −8.458E−02 |
| A6 | 1.319E−02 | 1.465E−01 | −1.445E−02 | −1.335E−02 | 2.206E−02 | 3.993E−02 |
| A8 | −1.139E−02 | −1.926E−01 | −8.533E−03 | −6.953E−03 | 1.029E−02 | −1.508E−02 |
| A10 | −1.164E−02 | 1.787E−01 | 2.448E−03 | −2.396E−03 | −5.037E−03 | 3.747E−03 |
| A12 | 2.115E−02 | −9.059E−02 | 0.000E+00 | 3.250E−03 | 7.691E−04 | −5.702E−04 |
| A14 | −8.495E−03 | 2.335E−02 | 0.000E+00 | −8.502E−04 | −4.070E−05 | 4.717E−05 |
| A16 | 0.000E+00 | −2.439E−03 | 0.000E+00 | 6.994E−05 | −1.855E−08 | −1.601E−06 |

As shown in Table 13, the imaging lens in Example 3 satisfies conditional expressions (1) to (18).

Figure 6:
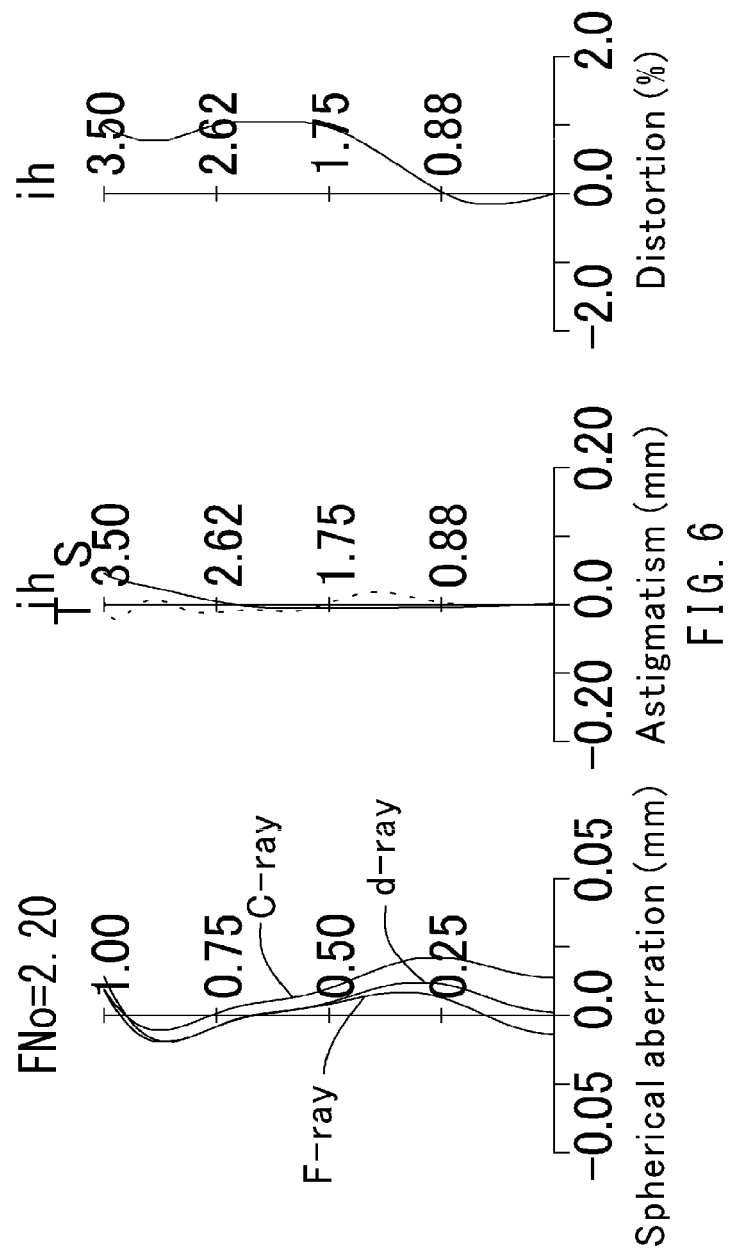
FIG. 6 shows spherical aberration, astigmatism, and distortion of the imaging lens in Example 3 according to the present invention.
Figure 7:
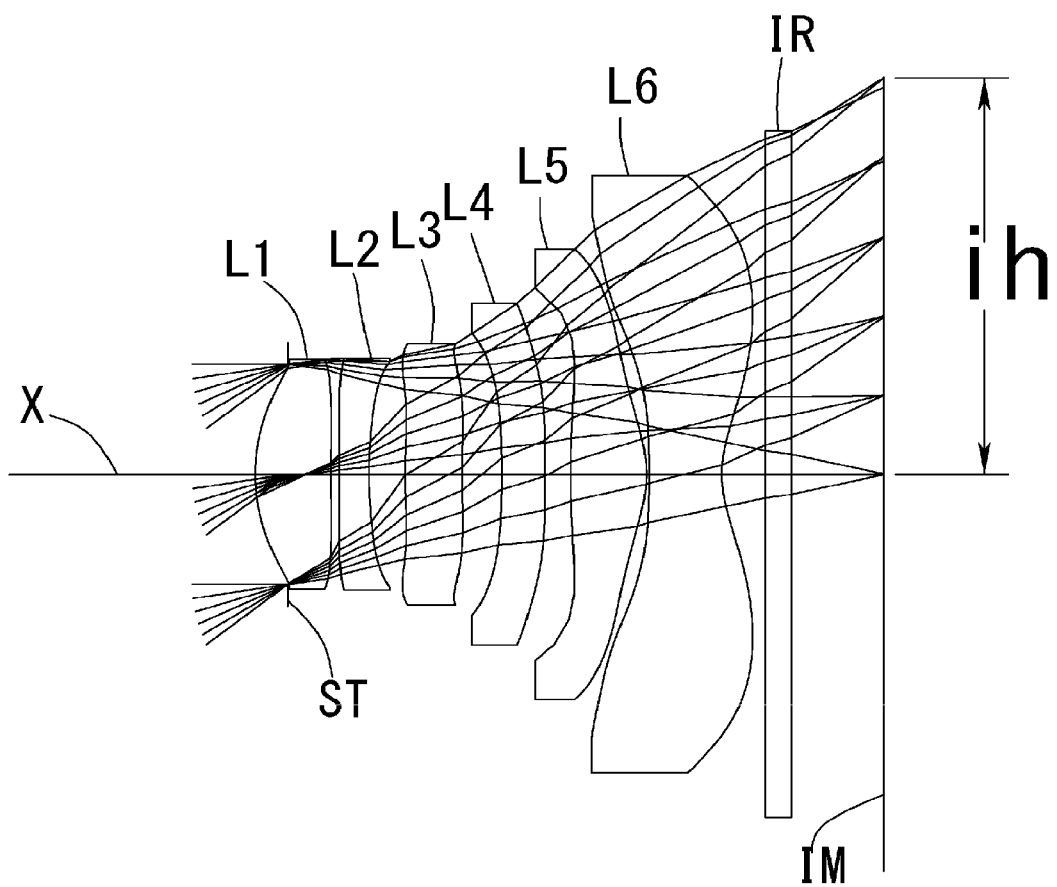
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected properly.

Example 4

The basic lens data of Example 4 is shown below in Table 4.

TABLE 4

Numerical Data Example 4
Unit mm $f = 4.26$
$Fno = 2.20$
$\omega\ (°) = 39.0$
$ih = 3.50$
$TTL = 5.00$ Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.264 | | |
| 2* | 1.692 | 0.610 | 1.5443 | 55.86 |
| 3* | 9.965 | 0.066 | | |
| 4* | 9.192 | 0.240 | 1.6503 | 21.54 |
| 5* | 3.580 | 0.295 | | |
| 6* | 6.486 | 0.458 | 1.5348 | 55.66 |
| 7* | 11.687 | 0.322 | | |
| 8* | −10.403 | 0.346 | 1.6391 | 23.25 |
| 9* | 100.000 | 0.209 | | |
| 10* | 10.132 | 0.609 | 1.5348 | 55.66 |
| 11* | −1.176 | 0.020 | | |
| 12* | −12.263 | 0.586 | 1.5348 | 55.66 |
| 13* | 0.997 | 0.350 | | |
| 14 | Infinity | 0.210 | 1.5168 | 64.20 |
| 15 | Infinity | 0.751 | | |
| Image Plane | Infinity | | | |

Constituent Lens Data

| Lens | Start Surface | Focal Length | | |
|---|---|---|---|---|
| 1 | 2 | 3.65 | f12 = 5.32 | |
| 2 | 4 | −9.17 | E5 = 0.34 | |
| 3 | 6 | 26.44 | Ph51 = 0.95 | |
| 4 | 8 | −14.73 | | |
| 5 | 10 | 2.01 | | |
| 6 | 12 | −1.70 | | |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −1.140E−02 | −2.355E−01 | −3.247E−01 | −2.093E−01 | −1.957E−01 | −1.018E−01 |
| A6 | 2.003E−02 | 4.400E−01 | 7.636E−01 | 5.165E−01 | 1.280E−01 | −5.208E−02 |
| A8 | −8.841E−02 | −4.256E−01 | −7.201E−01 | −5.112E−01 | −1.771E−01 | 7.071E−02 |
| A10 | 1.001E−01 | 1.269E−01 | 2.722E−01 | 2.929E−01 | 2.030E−01 | −3.804E−02 |
| A12 | −5.931E−02 | 0.000E+00 | −1.222E−02 | −6.154E−02 | −5.938E−02 | 2.315E−02 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −7.797E+00 | 0.000E+00 | −7.557E+00 |
| A4 | −6.768E−02 | −1.478E−01 | −2.750E−03 | 5.950E−02 | −9.737E−02 | −8.533E−02 |
| A6 | 1.315E−02 | 1.509E−01 | −1.134E−02 | −7.888E−04 | 2.050E−02 | 4.115E−02 |
| A8 | −2.011E−02 | −1.931E−01 | −7.920E−03 | −1.052E−02 | 1.037E−02 | −1.547E−02 |
| A10 | −1.865E−03 | 1.782E−01 | 1.722E−03 | −2.255E−03 | −5.002E−03 | 3.789E−03 |
| A12 | 2.094E−02 | −9.064E−02 | 0.000E+00 | 3.285E−03 | 7.700E−04 | −5.726E−04 |
| A14 | −9.781E−03 | 2.344E−02 | 0.000E+00 | −8.406E−04 | −4.159E−05 | 4.742E−05 |
| A16 | 0.000E+00 | −2.462E−03 | 0.000E+00 | 6.770E−05 | 0.000E+00 | −1.621E−06 |

As shown in Table 13, the imaging lens in Example 4 satisfies conditional expressions (1) to (18).

Figure 8:
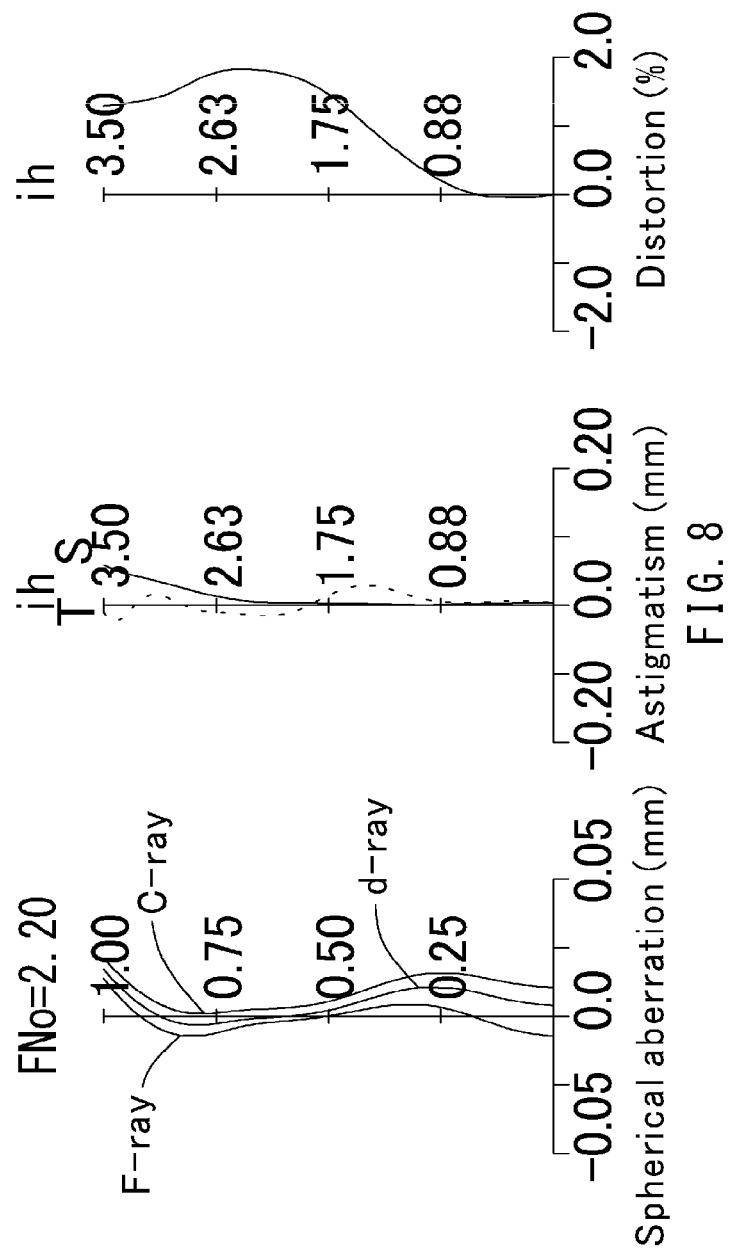
FIG. 8 shows spherical aberration, astigmatism, and distortion of the imaging lens in Example 4 according to the present invention.
Figure 9:
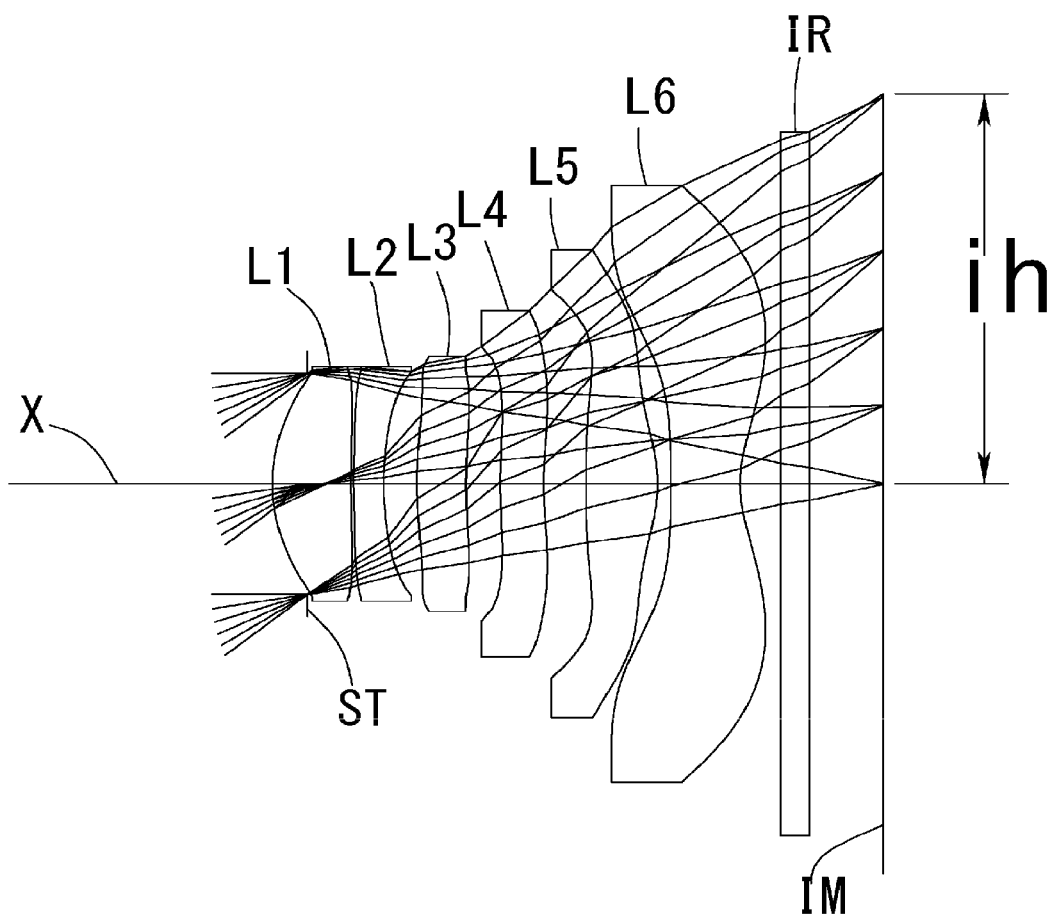
FIG. 9 is a schematic view showing the general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected properly.

Example 5

The basic lens data of Example 5 is shown below in Table 5.

TABLE 5

Numerical Data Example 5
Unit mm f = 3.83
Fno = 2.15
ω (°) = 39.0
ih = 3.14
TTL = 4.43

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.257 | | |
| 2* | 1.470 | 0.573 | 1.5443 | 55.86 |
| 3* | 5.162 | 0.021 | | |
| 4* | 5.042 | 0.223 | 1.6391 | 23.25 |
| 5* | 2.593 | 0.245 | | |
| 6* | 3.750 | 0.361 | 1.5348 | 55.66 |
| 7* | 5.160 | 0.252 | | |
| 8* | 4.525 | 0.320 | 1.6391 | 23.25 |
| 9* | 3.397 | 0.310 | | |
| 10* | 15.298 | 0.527 | 1.5348 | 55.66 |
| 11* | −1.303 | 0.101 | | |
| 12* | −13.470 | 0.508 | 1.5348 | 55.66 |
| 13* | 1.108 | 0.300 | | |
| 14 | Infinity | 0.210 | 1.5168 | 64.20 |
| 15 | Infinity | 0.549 | | |
| Image Plane | Infinity | | | |

Constituent Lens Data

| Lens | Start Surface | Focal Length | | |
|---|---|---|---|---|
| 1 | 2 | 3.58 | f12 = 5.27 | |
| 2 | 4 | −8.66 | E5 = 0.30 | |
| 3 | 6 | 23.55 | Ph51 = 0.98 | |
| 4 | 8 | −23.99 | | |
| 5 | 10 | 2.27 | | |
| 6 | 12 | −1.89 | | |

Aspheric Surface Data

| | 2nd Surface | 3rd Surface | 4th Surface | 5th Surface | 6th Surface | 7th Surface |
|---|---|---|---|---|---|---|
| k | −1.078E+00 | 3.320E−01 | −8.751E+00 | −3.071E+01 | 0.000E+00 | 0.000E+00 |
| A4 | 3.168E−02 | −3.840E−01 | −4.028E−01 | 8.816E−02 | −1.367E−01 | −1.311E−01 |
| A6 | 4.980E−02 | 4.008E−01 | 5.842E−01 | −4.610E−02 | 2.134E−01 | 1.223E−01 |
| A8 | −1.736E−01 | 1.821E+00 | 1.888E+00 | 6.821E−01 | −1.190E+00 | −2.058E−01 |
| A10 | 2.593E−01 | −6.565E+00 | −7.513E+00 | −1.707E+00 | 3.493E+00 | −1.454E−01 |
| A12 | −1.941E−01 | 8.564E+00 | 1.062E+01 | 1.968E+00 | −5.729E+00 | 7.387E−01 |
| A14 | 1.686E−02 | −5.202E+00 | −7.009E+00 | −8.380E−01 | 4.823E+00 | −8.386E−01 |
| A16 | 0.000E+00 | 1.220E+00 | 1.818E+00 | 4.273E−02 | −1.539E+00 | 3.527E−01 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −8.035E+00 | 0.000E+00 | −7.692E+00 |
| A4 | −2.588E−01 | −2.643E−01 | 7.689E−02 | 1.087E−01 | −9.204E−02 | −1.091E−01 |
| A6 | 2.378E−01 | 2.097E−01 | −4.853E−02 | 6.958E−02 | −2.832E−02 | 4.746E−02 |
| A8 | −1.892E−01 | −1.820E−01 | −2.715E−02 | −1.569E−01 | 4.708E−02 | −1.720E−02 |
| A10 | 3.666E−02 | 1.247E−01 | 1.353E−02 | 9.217E−02 | −1.656E−02 | 3.834E−03 |
| A12 | 3.159E−02 | −3.977E−02 | −2.325E−03 | −2.788E−02 | 2.504E−03 | −4.601E−04 |
| A14 | −2.498E−02 | 9.051E−05 | 5.748E−04 | 4.564E−03 | −1.433E−04 | 2.270E−05 |
| A16 | 0.000E+00 | 1.596E−03 | −7.488E−05 | −3.209E−04 | −1.054E−07 | 0.000E+00 |

As shown in Table 13, the imaging lens in Example 5 satisfies conditional expressions (1) to (18).

Figure 10:
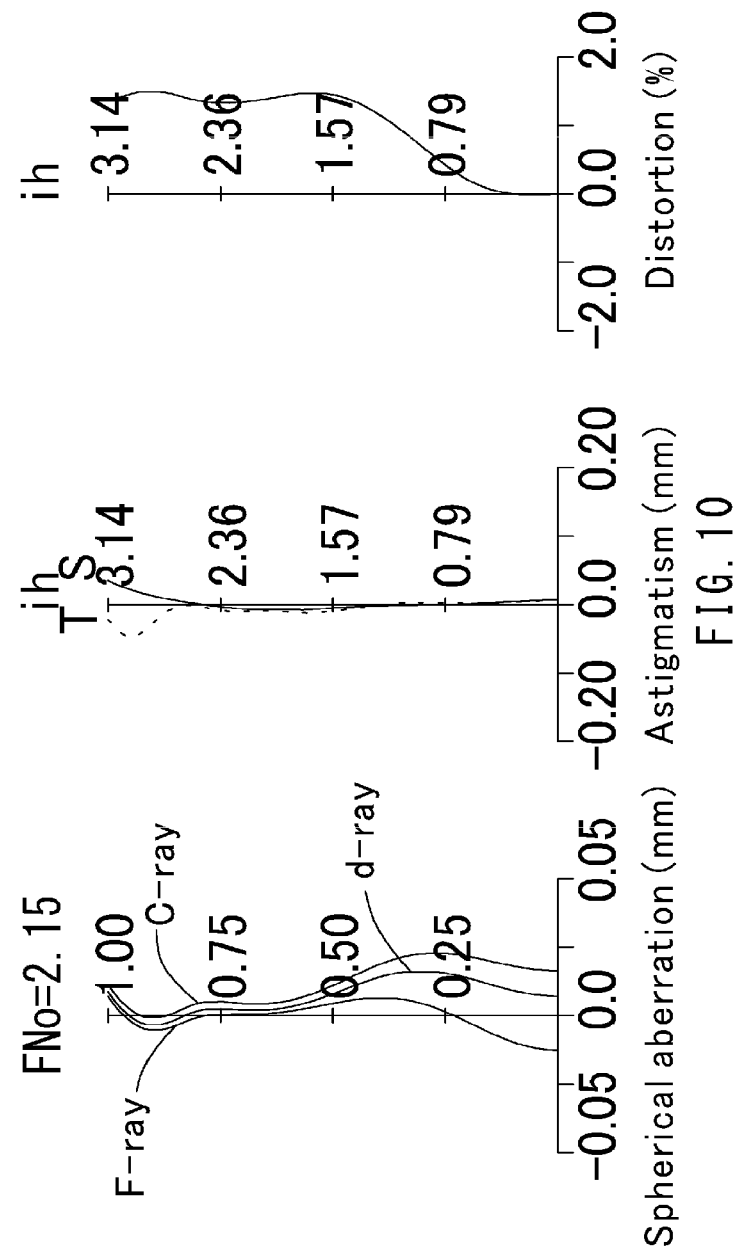
FIG. 10 shows spherical aberration, astigmatism, and distortion of the imaging lens in Example 5 according to the present invention.
Figure 11:
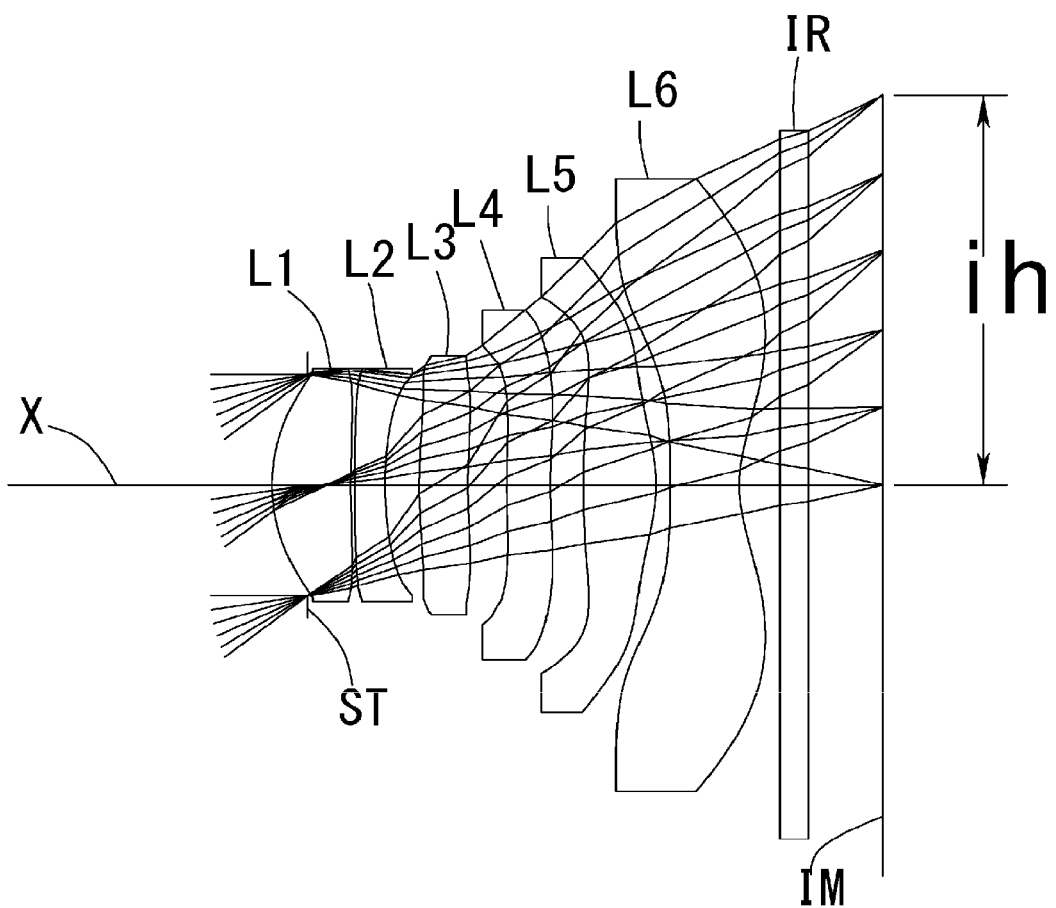
FIG. 11 is a schematic view showing the general configuration of an imaging lens in Example 6 according to the present invention.

FIG. 10 shows spherical aberration (mm), astigmatism (mm), and distortion (%) of the imaging lens in Example 5. As shown in FIG. 10, each aberration is corrected properly.

Example 6

The basic lens data of Example 6 is shown below in Table 6.

TABLE 6

Numerical Data Example 6
Unit mm $f = 3.83$
$Fno = 2.15$
$\omega \, (°) = 39.0$
$ih = 3.14$
$TTL = 4.43$ Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.265 | | |
| 2* | 1.444 | 0.580 | 1.5443 | 55.86 |
| 3* | 4.908 | 0.028 | | |
| 4* | 5.747 | 0.223 | 1.6391 | 23.25 |
| 5* | 2.904 | 0.253 | | |
| 6* | 4.224 | 0.360 | 1.5348 | 55.66 |
| 7* | 5.604 | 0.283 | | |
| 8* | 6.573 | 0.320 | 1.6391 | 23.25 |
| 9* | 4.232 | 0.248 | | |
| 10* | 12.360 | 0.534 | 1.5348 | 55.66 |
| 11* | −1.340 | 0.102 | | |
| 12* | −15.883 | 0.508 | 1.5348 | 55.66 |
| 13* | 1.116 | 0.300 | | |
| 14 | Infinity | 0.210 | 1.5168 | 64.20 |
| 15 | Infinity | 0.552 | | |
| Image Plane | Infinity | | | |

Constituent Lens Data

| Lens | Start Surface | Focal Length | | |
|---|---|---|---|---|
| 1 | 2 | 3.55 | f12 = 4.99 | |
| 2 | 4 | −9.47 | E5 = 0.30 | |
| 3 | 6 | 29.39 | Ph51 = 0.92 | |
| 4 | 8 | −19.63 | | |
| 5 | 10 | 2.29 | | |
| 6 | 12 | −1.93 | | |

Aspheric Surface Data

| | 2nd Surface | 3rd Surface | 4th Surface | 5th Surface | 6th Surface | 7th Surface |
|---|---|---|---|---|---|---|
| k | −1.030E+00 | 0.000E+00 | 0.000E+00 | −2.500E+01 | 0.000E+00 | 0.000E+00 |
| A4 | 3.317E−02 | −3.693E−01 | −4.006E−01 | 1.238E−02 | −1.199E−01 | −1.295E−01 |
| A6 | 4.506E−02 | 8.164E−01 | 1.113E+00 | 3.578E−01 | −7.253E−02 | 1.416E−01 |
| A8 | −1.365E−01 | −9.819E−01 | −1.381E+00 | −4.760E−01 | 4.698E−01 | −4.336E−01 |
| A10 | 1.982E−01 | 3.965E−01 | 7.323E−01 | 3.644E−01 | −1.070E+00 | 6.745E−01 |
| A12 | −1.452E−01 | 0.000E+00 | −6.486E−02 | −3.459E−02 | 1.054E+00 | −6.075E−01 |
| A14 | 0.000E+00 | 0.000E+00 | 0.000E+00 | 0.000E+00 | −3.225E−01 | 2.478E−01 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −9.688E+00 | 0.000E+00 | −8.347E+00 |
| A4 | −1.908E−01 | −2.130E−01 | 8.072E−02 | 9.241E−02 | −8.973E−02 | −8.920E−02 |
| A6 | 1.087E−01 | 1.111E−01 | −9.364E−02 | 7.874E−02 | −2.778E−02 | 2.903E−02 |
| A8 | 2.771E−02 | −2.788E−02 | 8.791E−03 | −1.948E−01 | 4.702E−02 | −7.062E−03 |
| A10 | −2.129E−01 | −3.660E−02 | 1.013E−03 | 1.345E−01 | −1.663E−02 | 1.007E−03 |
| A12 | 1.886E−01 | 5.533E−02 | 0.000E+00 | −4.859E−02 | 2.509E−03 | −7.062E−05 |
| A14 | −6.522E−02 | −2.829E−02 | 0.000E+00 | 9.371E−03 | −1.417E−04 | 1.763E−06 |
| A16 | 0.000E+00 | 4.795E−03 | 0.000E+00 | −7.531E−04 | −2.680E−07 | 0.000E+00 |

As shown in Table 13, the imaging lens in Example 6 satisfies conditional expressions (1) to (18).

Figure 12:
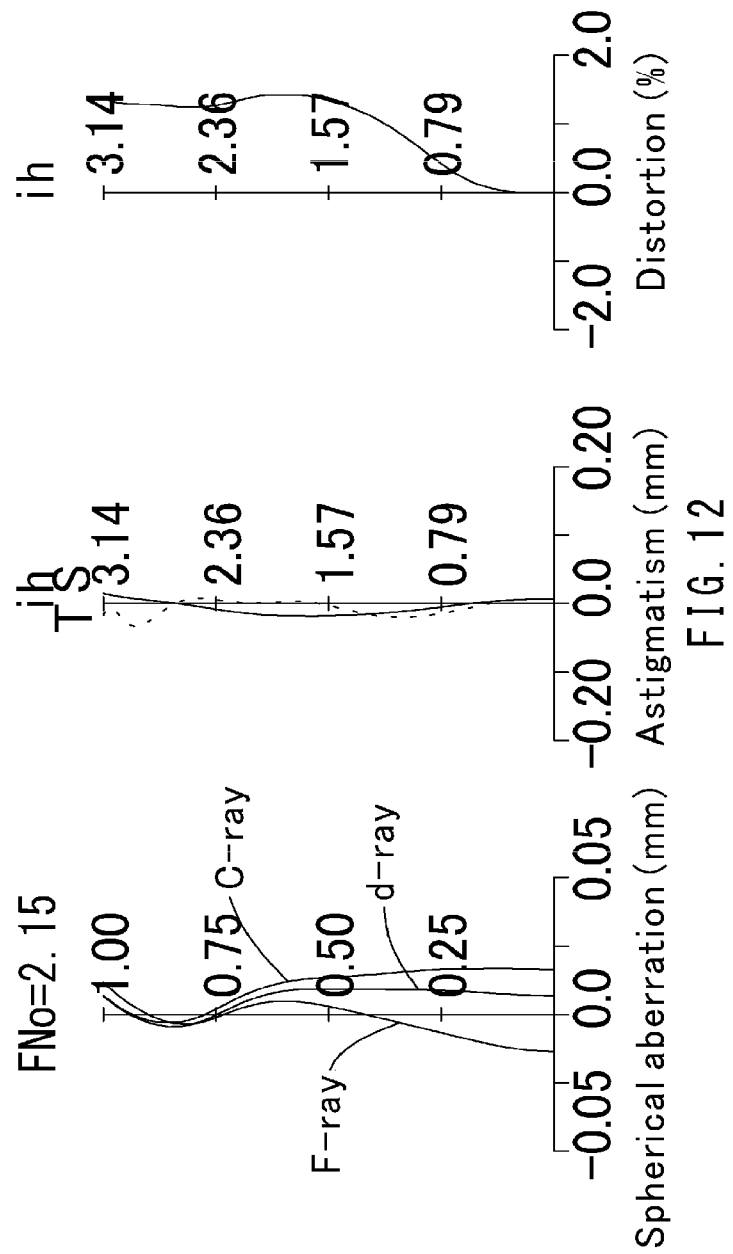
FIG. 12 shows spherical aberration, astigmatism, and distortion of the imaging lens in Example 6 according to the present invention.
Figure 13:
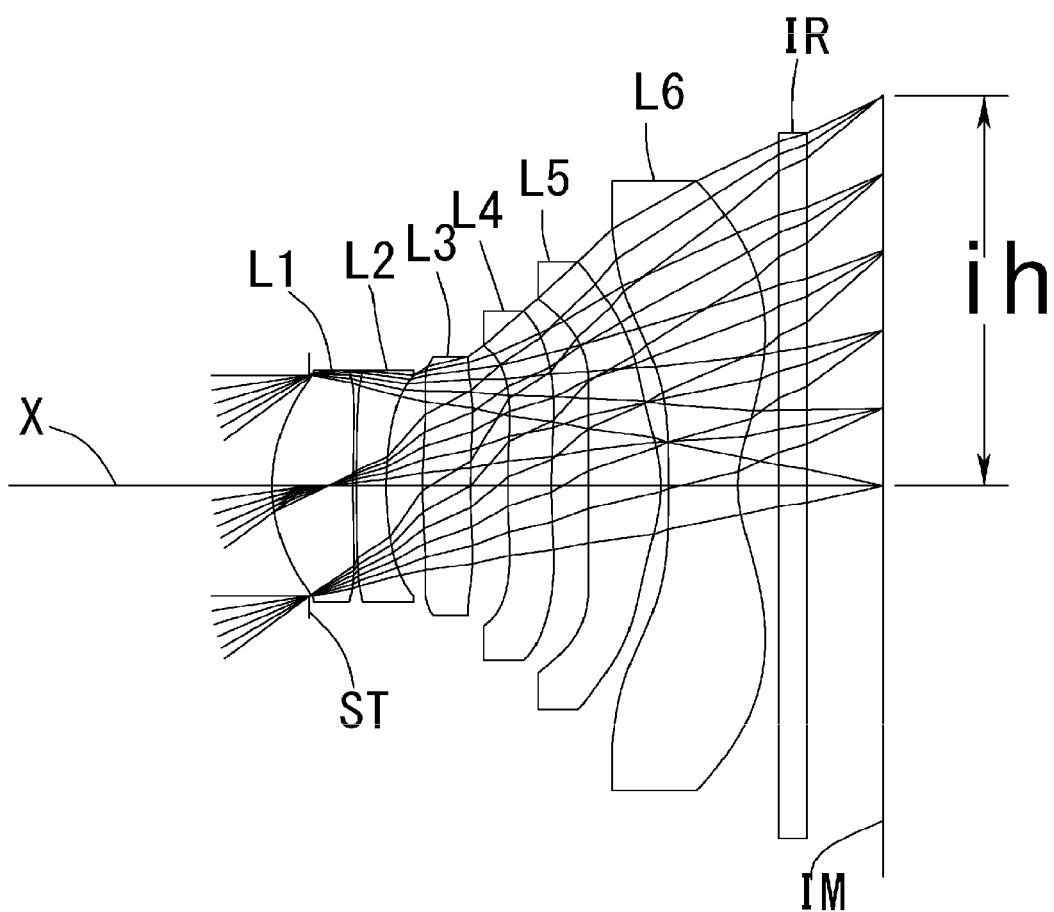
FIG. 13 is a schematic view showing the general configuration of an imaging lens in Example 7 according to the present invention.

FIG. 12 shows spherical aberration (mm), astigmatism (mm), and distortion (%) of the imaging lens in Example 6. As shown in FIG. 12, each aberration is corrected properly.

Example 7

The basic lens data of Example 7 is shown below in Table 7.

TABLE 7

Numerical Data Example 7
Unit mm f = 3.84
Fno = 2.16
ω (°) = 39.0
ih = 3.14
TTL = 4.43

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.271 | | |
| 2* | 1.437 | 0.591 | 1.5443 | 55.86 |
| 3* | 5.668 | 0.026 | | |
| 4* | 6.528 | 0.223 | 1.6391 | 23.25 |
| 5* | 2.922 | 0.265 | | |
| 6* | 4.617 | 0.353 | 1.5348 | 55.66 |
| 7* | 5.829 | 0.278 | | |
| 8* | 6.839 | 0.320 | 1.6391 | 23.25 |
| 9* | 6.074 | 0.268 | | |
| 10* | −43.898 | 0.535 | 1.5348 | 55.66 |
| 11* | −1.210 | 0.059 | | |
| 12* | −17.664 | 0.508 | 1.5348 | 55.66 |
| 13* | 1.041 | 0.300 | | |
| 14 | Infinity | 0.210 | 1.5168 | 64.20 |
| 15 | Infinity | 0.565 | | |
| Image Plane | Infinity | | | |

Constituent Lens Data

| Lens | Start Surface | Focal Length | | |
|---|---|---|---|---|
| 1 | 2 | 3.37 | f12 = 4.86 | |
| 2 | 4 | −8.48 | E5 = 0.30 | |
| 3 | 6 | 37.69 | Ph51 = 0.74 | |
| 4 | 8 | −101.52 | | |
| 5 | 10 | 2.32 | | |
| 6 | 12 | −1.82 | | |

Aspheric Surface Data

| | 2nd Surface | 3rd Surface | 4th Surface | 5th Surface | 6th Surface | 7th Surface |
|---|---|---|---|---|---|---|
| k | −9.773E−01 | 0.000E+00 | 0.000E+00 | −2.500E+01 | 0.000E+00 | 0.000E+00 |
| A4 | 3.518E−02 | −3.660E−01 | −3.850E−02 | 2.674E−02 | −1.661E−01 | −1.178E−01 |
| A6 | 3.941E−02 | 8.299E−01 | 1.059E+00 | 2.690E−01 | 1.420E−01 | −6.370E−02 |
| A8 | −1.363E−01 | −9.798E−01 | −1.209E+00 | −1.997E−01 | −2.435E−01 | 1.589E−01 |
| A10 | 2.039E−01 | 3.843E−01 | 5.213E−01 | 2.175E−02 | 2.078E−01 | −2.506E−01 |
| A12 | −1.466E−01 | 0.000E+00 | 1.708E−02 | 1.112E−01 | 0.000E+00 | 1.634E−01 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 6.530E−06 | 0.000E+00 | 0.000E+00 | −8.613E+00 | 0.000E+00 | −8.102E+00 |
| A4 | −7.490E−02 | −8.154E−02 | 8.974E−02 | 6.549E−02 | −8.688E−02 | −8.975E−02 |
| A6 | −2.533E−01 | −1.514E−01 | −1.013E−01 | 8.292E−02 | −2.917E−02 | 2.903E−02 |
| A8 | 6.735E−01 | 3.608E−01 | 4.820E−03 | −1.933E−01 | 4.679E−02 | −6.732E−03 |
| A10 | −9.884E−01 | −4.596E−01 | 4.231E−03 | 1.345E−01 | −1.659E−02 | 9.187E−04 |
| A12 | 6.864E−01 | 3.307E−01 | 0.000E+00 | −4.861E−02 | 2.523E−03 | −6.836E−05 |
| A14 | −1.864E−01 | −1.209E−01 | 0.000E+00 | 9.361E−03 | −1.415E−04 | 2.511E−06 |
| A16 | 0.000E+00 | 1.717E−02 | 0.000E+00 | −7.565E−04 | −7.668E−07 | −3.133E−08 |

As shown in Table 13, the imaging lens in Example 7 satisfies conditional expressions (1) to (18).

Figure 14:
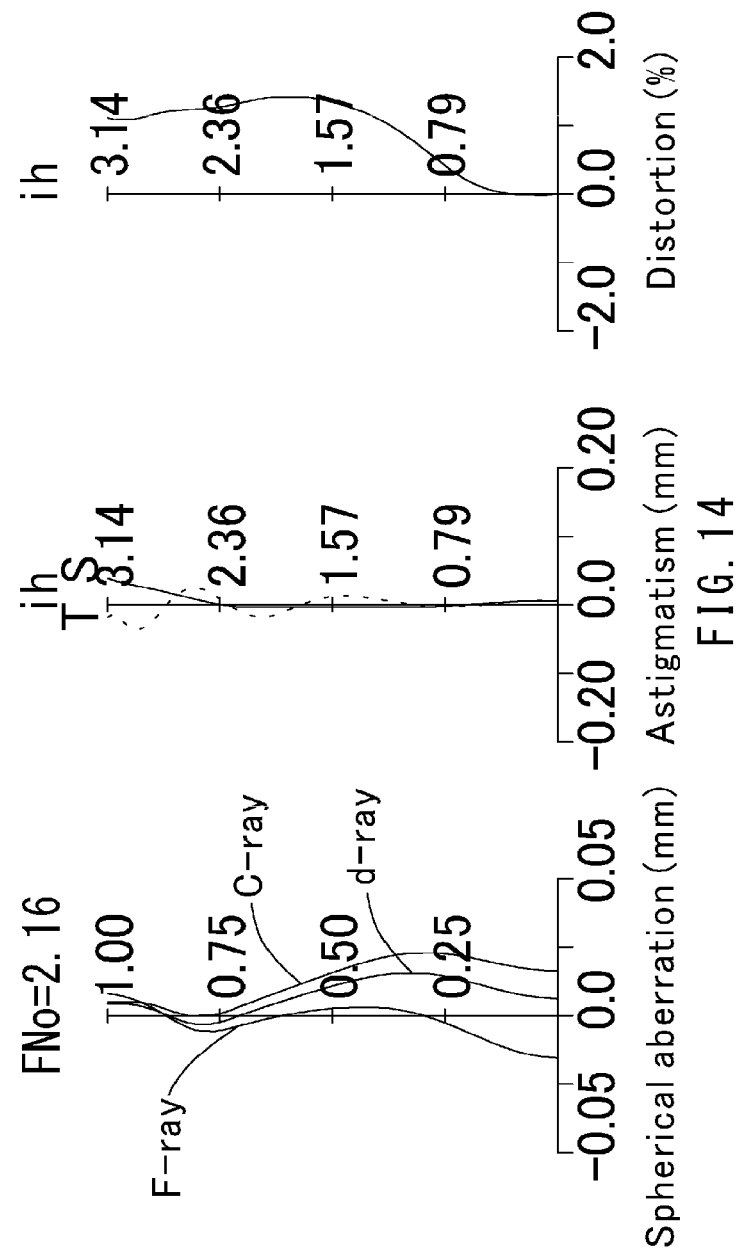
FIG. 14 shows spherical aberration, astigmatism, and distortion of the imaging lens in Example 7 according to the present invention.
Figure 15:
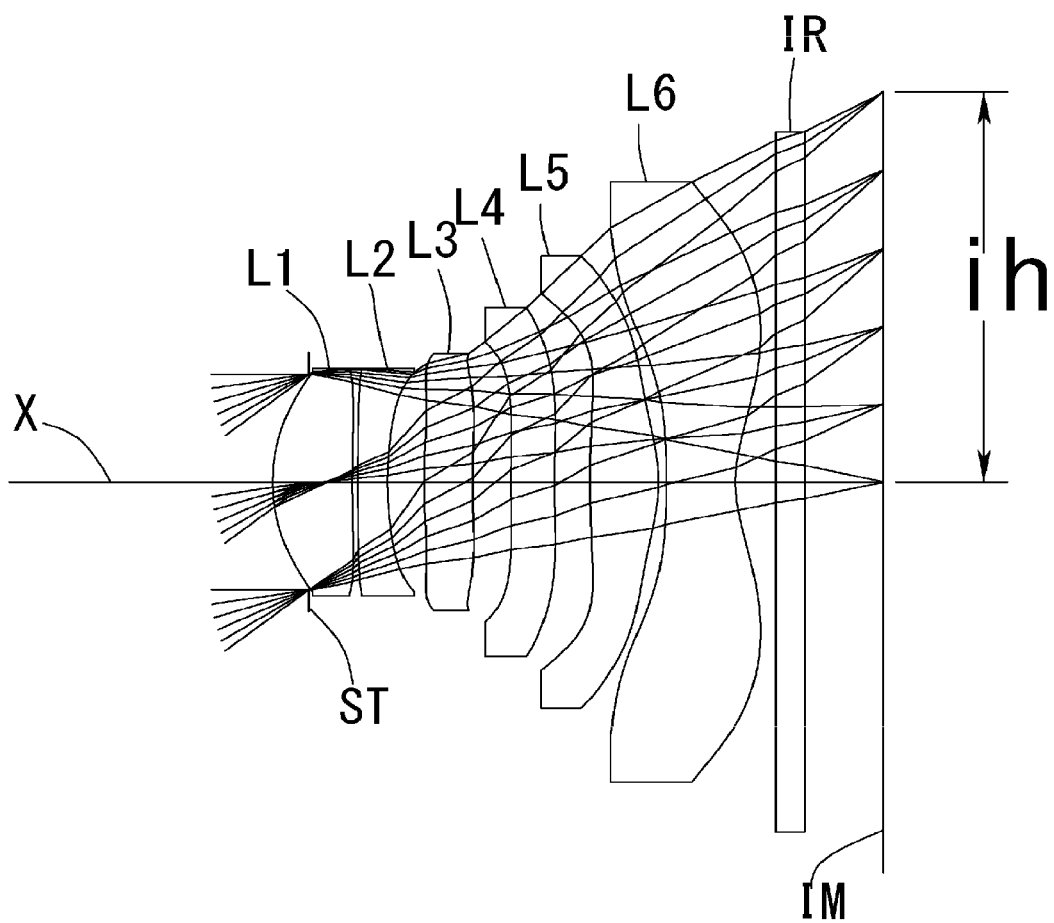
FIG. 15 is a schematic view showing the general configuration of an imaging lens in Example 8 according to the present invention.

FIG. 14 shows spherical aberration (mm), astigmatism (mm), and distortion (%) of the imaging lens in Example 7. As shown in FIG. 14, each aberration is corrected properly.

Example 8

The basic lens data of Example 8 is shown below in Table 8.

TABLE 8

Numerical Data Example 8
Unit mm f = 3.89
Fno = 2.24
ω (°) = 38.6
ih = 3.14
TTL = 4.43

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.266 | | |
| 2* | 1.426 | 0.587 | 1.5443 | 55.86 |
| 3* | 5.934 | 0.036 | | |
| 4* | 7.067 | 0.223 | 1.6391 | 23.25 |
| 5* | 3.009 | 0.273 | | |
| 6* | 5.729 | 0.354 | 1.5348 | 55.66 |
| 7* | 8.689 | 0.282 | | |
| 8* | 16.553 | 0.320 | 1.6391 | 23.25 |
| 9* | 10.022 | 0.263 | | |
| 10* | 18.021 | 0.505 | 1.5348 | 55.66 |
| 11* | −1.336 | 0.055 | | |
| 12* | −9.729 | 0.508 | 1.5348 | 55.66 |
| 13* | 1.099 | 0.300 | | |
| 14 | Infinity | 0.210 | 1.5168 | 64.20 |
| 15 | Infinity | 0.585 | | |
| Image Plane | Infinity | | | |

Constituent Lens Data

| Lens | Start Surface | Focal Length | | |
|---|---|---|---|---|
| 1 | 2 | 3.30 | f12 = 4.73 | |
| 2 | 4 | −8.38 | E5 = 0.29 | |
| 3 | 6 | 30.18 | Ph51 = 0.79 | |
| 4 | 8 | −40.52 | | |
| 5 | 10 | 2.35 | | |
| 6 | 12 | −1.82 | | |

Aspheric Surface Data

| | 2nd Surface | 3rd Surface | 4th Surface | 5th Surface | 6th Surface | 7th Surface |
|---|---|---|---|---|---|---|
| k | −9.949E−01 | 0.000E+00 | 0.000E+00 | −1.424E+01 | 0.000E+00 | 0.000E+00 |
| A4 | 3.632E−02 | −3.296E−01 | −3.707E−01 | −5.621E−02 | −1.637E−01 | −9.995E−02 |
| A6 | 4.791E−02 | 7.065E−01 | 9.815E−01 | 4.590E−01 | 1.183E−01 | −1.041E−01 |
| A8 | −1.651E−01 | −8.135E−01 | −1.067E+00 | −4.713E−01 | −1.748E−01 | 2.300E−01 |
| A10 | 2.595E−01 | 2.980E−01 | 3.925E−01 | 2.565E−01 | 1.731E−01 | −2.959E−01 |
| A12 | −1.832E−01 | 0.000E+00 | 5.971E−02 | 2.688E−02 | −3.747E−05 | 1.764E−01 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −9.015E+00 | 0.000E+00 | −8.353E+00 |
| A4 | −7.894E−02 | −1.144E−01 | 5.526E−02 | 1.327E−01 | −1.128E−01 | −1.186E−01 |
| A6 | −1.053E−01 | −1.465E−02 | −8.701E−02 | −5.089E−02 | 2.299E−02 | 6.874E−02 |
| A8 | 3.001E−01 | 1.013E−01 | 3.153E−04 | −4.242E−02 | 1.862E−02 | −3.235E−02 |
| A10 | −4.832E−01 | −1.381E−01 | 5.016E−03 | 3.217E−02 | −9.583E−03 | 1.007E−02 |
| A12 | 3.357E−01 | 9.738E−02 | 8.967E−05 | −7.607E−03 | 1.708E−03 | −1.930E−03 |
| A14 | −8.881E−02 | −3.325E−02 | 0.000E+00 | 5.869E−04 | −1.103E−04 | 2.029E−04 |
| A16 | 0.000E+00 | 4.218E−03 | 0.000E+00 | 5.270E−06 | −9.641E−08 | −8.825E−06 |

As shown in Table 13, the imaging lens in Example 8 satisfies conditional expressions (1) to (18).

Figure 16:
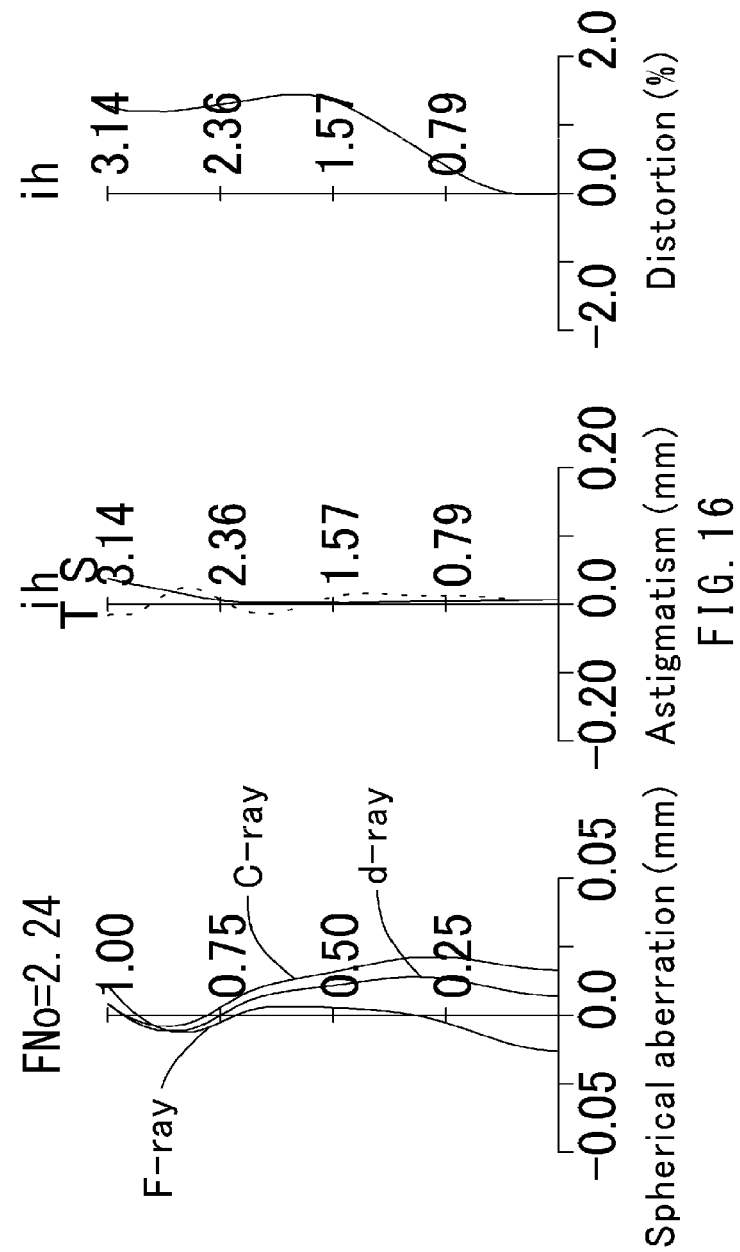
FIG. 16 shows spherical aberration, astigmatism, and distortion of the imaging lens in Example 8 according to the present invention.
Figure 17:
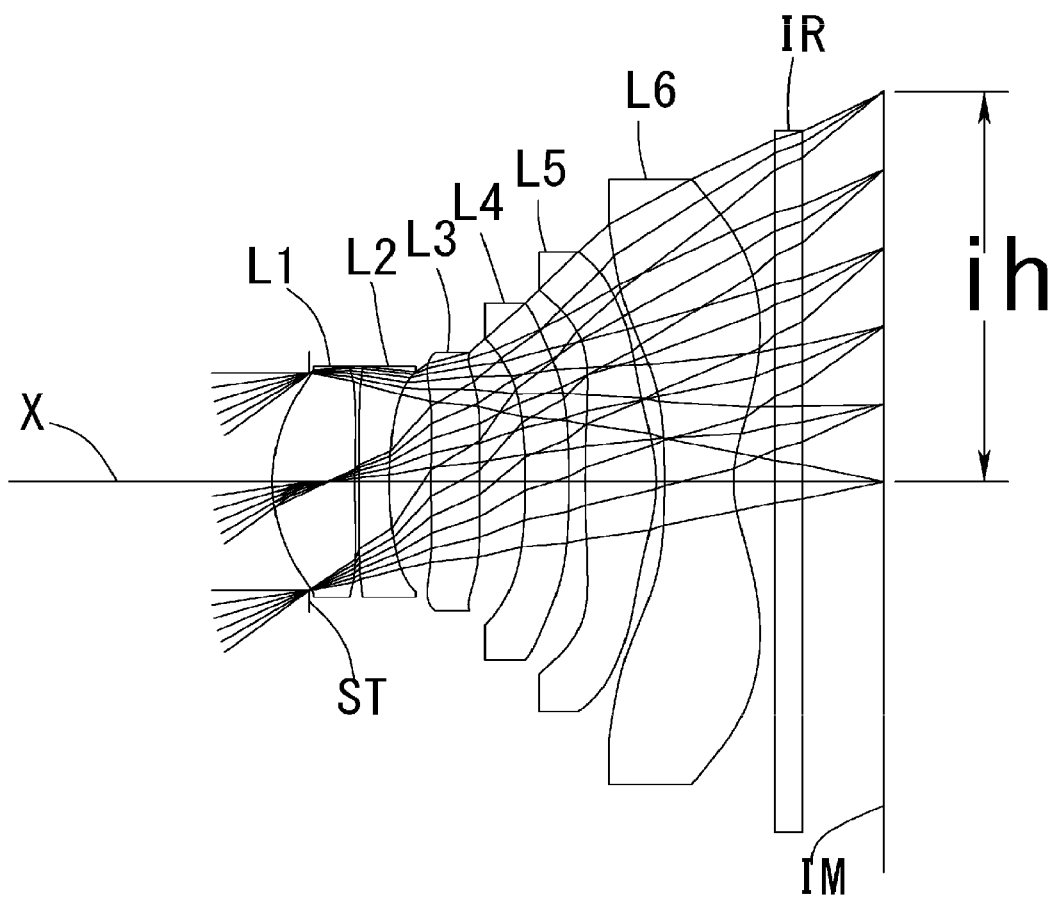
FIG. 17 is a schematic view showing the general configuration of an imaging lens in Example 9 according to the present invention.

FIG. 16 shows spherical aberration (mm), astigmatism (mm), and distortion (%) of the imaging lens in Example 8. As shown in FIG. 16, each aberration is corrected properly.

Example 9

The basic lens data of Example 9 is shown below in Table 9.

TABLE 9

Numerical Data Example 9
Unit mm f = 3.86
Fno = 2.20
ω (°) = 38.8
ih = 3.14
TTL = 4.43

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.270 | | |
| 2* | 1.418 | 0.605 | 1.5443 | 55.86 |
| 3* | 6.949 | 0.032 | | |
| 4* | 9.339 | 0.223 | 1.6391 | 23.25 |
| 5* | 3.376 | 0.307 | | |
| 6* | 8.309 | 0.360 | 1.5348 | 55.66 |
| 7* | 21.223 | 0.335 | | |
| 8* | −5.882 | 0.320 | 1.6391 | 23.25 |
| 9* | −14.711 | 0.119 | | |
| 10* | 11.304 | 0.523 | 1.5348 | 55.66 |
| 11* | −1.329 | 0.062 | | |
| 12* | −12.951 | 0.508 | 1.5348 | 55.66 |
| 13* | 1.060 | 0.300 | | |
| 14 | Infinity | 0.210 | 1.5168 | 64.20 |
| 15 | Infinity | 0.596 | | |
| Image Plane | Infinity | | | |

Constituent Lens Data

| Lens | Start Surface | Focal Length | | |
|---|---|---|---|---|
| 1 | 2 | 3.15 | f12 = 4.43 | |
| 2 | 4 | −8.40 | E5 = 0.29 | |
| 3 | 6 | 25.29 | Ph51 = 0.79 | |
| 4 | 8 | −15.56 | | |
| 5 | 10 | 2.26 | | |
| 6 | 12 | −1.81 | | |

Aspheric Surface Data

| | 2nd Surface | 3rd Surface | 4th Surface | 5th Surface | 6th Surface | 7th Surface |
|---|---|---|---|---|---|---|
| k | −9.531E−01 | 0.000E+00 | 0.000E+00 | 0.000E+00 | 0.000E+00 | 0.000E+00 |
| A4 | 3.395E−02 | −3.642E−01 | −3.934E−01 | −1.082E−01 | −1.828E−01 | −1.166E−01 |
| A6 | 6.286E−02 | 8.690E−01 | 1.136E+00 | 5.019E−01 | 6.653E−02 | −1.224E−01 |
| A8 | −2.029E−01 | −1.054E+00 | −1.318E+00 | −5.123E−01 | −8.182E−02 | 2.065E−01 |
| A10 | 3.160E−01 | 4.108E−01 | 5.291E−01 | 2.587E−01 | 7.324E−02 | −2.230E−01 |
| A12 | −2.175E−01 | 0.000E+00 | 5.611E−02 | 6.857E−02 | 6.212E−02 | 1.464E−01 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −9.435E+00 | 0.000E+00 | −7.741E+00 |
| A4 | −5.136E−02 | −1.435E−01 | −5.240E−03 | 8.597E−02 | −1.465E−01 | −1.203E−01 |
| A6 | −5.208E−02 | 1.393E−01 | −1.902E−02 | −1.548E−02 | 3.878E−02 | 6.928E−02 |
| A8 | 4.408E−02 | −2.507E−01 | −2.170E−02 | −1.697E−02 | 2.208E−02 | −3.218E−02 |
| A10 | −1.320E−01 | 2.880E−01 | 7.136E−03 | −6.481E−03 | −1.329E−02 | 9.897E−03 |
| A12 | 1.448E−01 | −1.715E−01 | 0.000E+00 | 1.079E−02 | 2.515E−03 | −1.866E−03 |
| A14 | −4.854E−02 | 5.253E−02 | 0.000E+00 | −3.443E−03 | −1.661E−04 | 1.920E−04 |
| A16 | 0.000E+00 | −6.757E−03 | 0.000E+00 | 3.457E−04 | −1.454E−07 | −8.138E−06 |

As shown in Table 13, the imaging lens in Example 9 satisfies conditional expressions (1) to (18).

Figure 18:
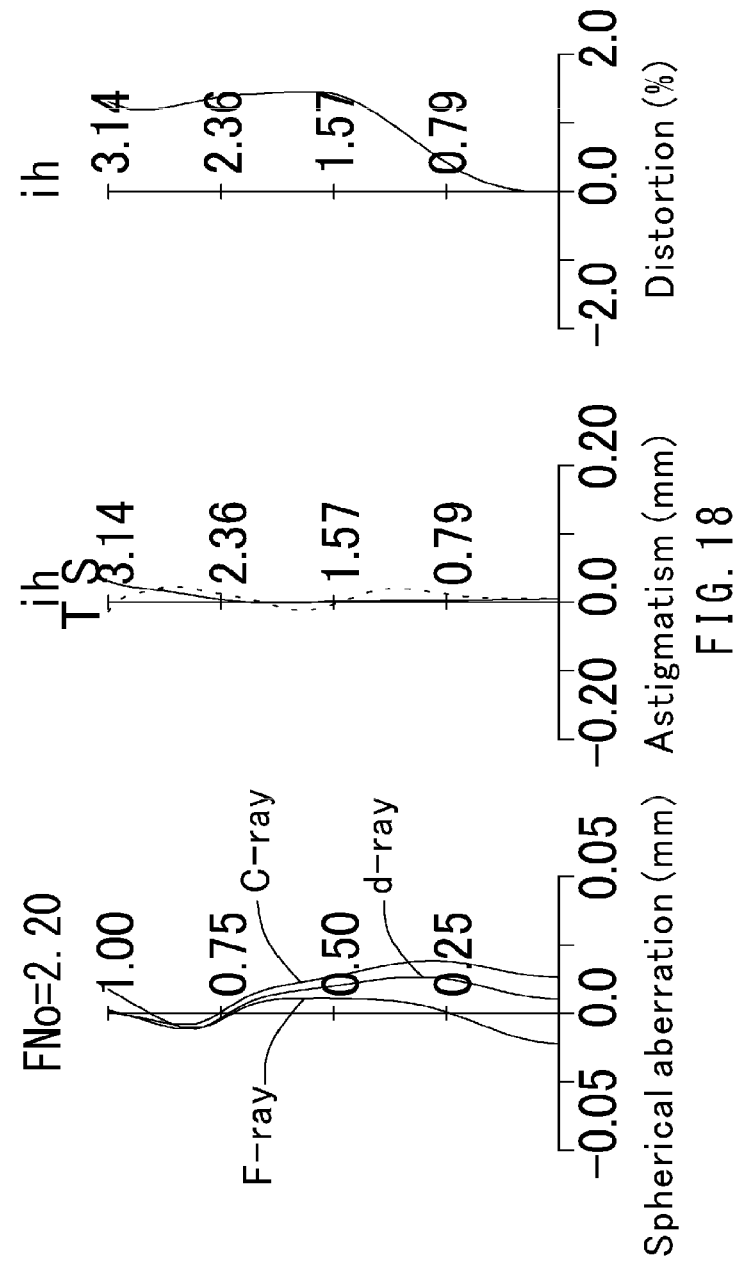
FIG. 18 shows spherical aberration, astigmatism, and distortion of the imaging lens in Example 9 according to the present invention.
Figure 19:
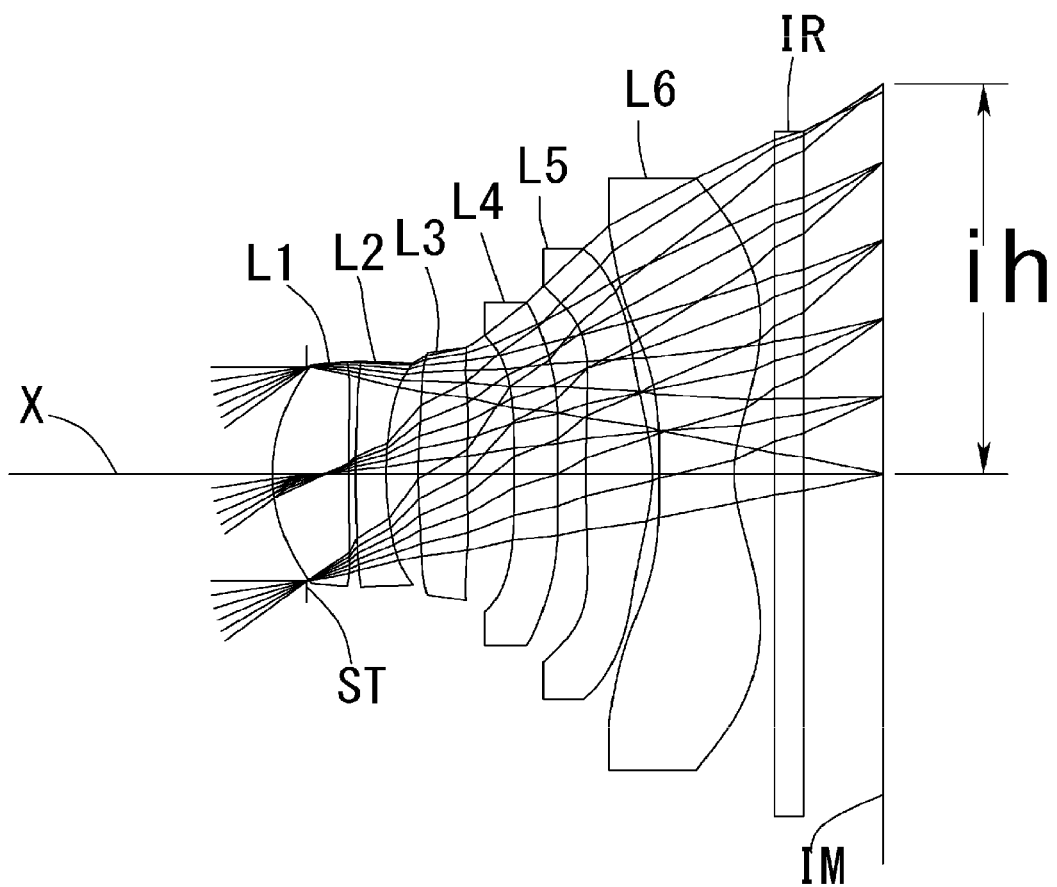
FIG. 19 is a schematic view showing the general configuration of an imaging lens in Example 10 according to the present invention.

FIG. 18 shows spherical aberration (mm), astigmatism (mm), and distortion (%) of the imaging lens in Example 9. As shown in FIG. 18, each aberration is corrected properly.

Example 10

The basic lens data of Example 10 is shown below in Table 10.

TABLE 10

Numerical Data Example 10
Unit mm f = 3.87
Fno = 2.25
ω (°) = 38.7
ih = 3.14
TTL = 4.427

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.255 | | |
| 2* | 1.449 | 0.561 | 1.5443 | 55.86 |
| 3* | 6.921 | 0.052 | | |
| 4* | 5.940 | 0.223 | 1.6391 | 23.25 |
| 5* | 2.447 | 0.238 | | |
| 6* | 4.064 | 0.360 | 1.5348 | 55.66 |
| 7* | 9.057 | 0.348 | | |
| 8* | −55.532 | 0.320 | 1.6391 | 23.25 |
| 9* | 16.329 | 0.208 | | |
| 10* | 16.659 | 0.488 | 1.5348 | 55.66 |
| 11* | −1.458 | 0.050 | | |
| 12* | −27.461 | 0.550 | 1.5348 | 55.66 |
| 13* | 1.119 | 0.300 | | |
| 14 | Infinity | 0.210 | 1.5168 | 64.20 |
| 15 | Infinity | 0.590 | | |
| Image Plane | Infinity | | | |

Constituent Lens Data

| Lens | Start Surface | Focal Length | | |
|---|---|---|---|---|
| 1 | 2 | 3.25 | f12 = | 5.22 |
| 2 | 4 | −6.68 | E5 = | 0.29 |
| 3 | 6 | 13.45 | Ph51 = | 0.76 |
| 4 | 8 | −19.71 | | |
| 5 | 10 | 2.53 | | |
| 6 | 12 | −2.00 | | |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −8.459E−03 | −3.124E−01 | −4.540E−01 | −2.715E−01 | −2.231E−01 | −1.256E−01 |
| A6 | 3.763E−02 | 8.122E−01 | 1.359E+00 | 8.932E−01 | 2.687E−01 | −2.083E−02 |
| A8 | −1.617E−01 | −9.870E−01 | −1.700E+00 | −1.136E+00 | −3.925E−01 | 9.294E−02 |
| A10 | 2.492E−01 | 3.793E−01 | 8.318E−01 | 8.266E−01 | 5.290E−01 | −8.488E−02 |
| A12 | −1.719E−01 | 0.000E+00 | −5.708E−02 | −2.327E−01 | −2.335E−01 | 7.342E−02 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −1.001E+01 | 0.000E+00 | −7.644E+00 |
| A4 | −1.079E−01 | −1.919E−01 | 7.893E−03 | 9.096E−02 | −1.493E−01 | −1.185E−01 |
| A6 | −5.051E−02 | 1.824E−01 | −2.672E−02 | −1.761E−02 | 3.817E−02 | 6.793E−02 |
| A8 | 1.834E−01 | −2.823E−01 | −2.118E−02 | −1.664E−02 | 2.212E−02 | −3.208E−02 |
| A10 | −3.154E−01 | 3.285E−01 | 7.638E−03 | −6.499E−03 | −1.328E−02 | 9.915E−03 |
| A12 | 2.542E−01 | −2.089E−01 | 0.000E+00 | 1.074E−02 | 2.522E−03 | −1.866E−03 |
| A14 | −8.380E−02 | 6.761E−02 | 0.000E+00 | −3.436E−03 | −1.659E−04 | 1.920E−04 |
| A16 | 0.000E+00 | −8.947E−03 | 0.000E+00 | 3.479E−04 | −4.711E−07 | −8.201E−06 |

As shown in Table 13, the imaging lens in Example 10 satisfies conditional expressions (1) to (18).

Figure 20:
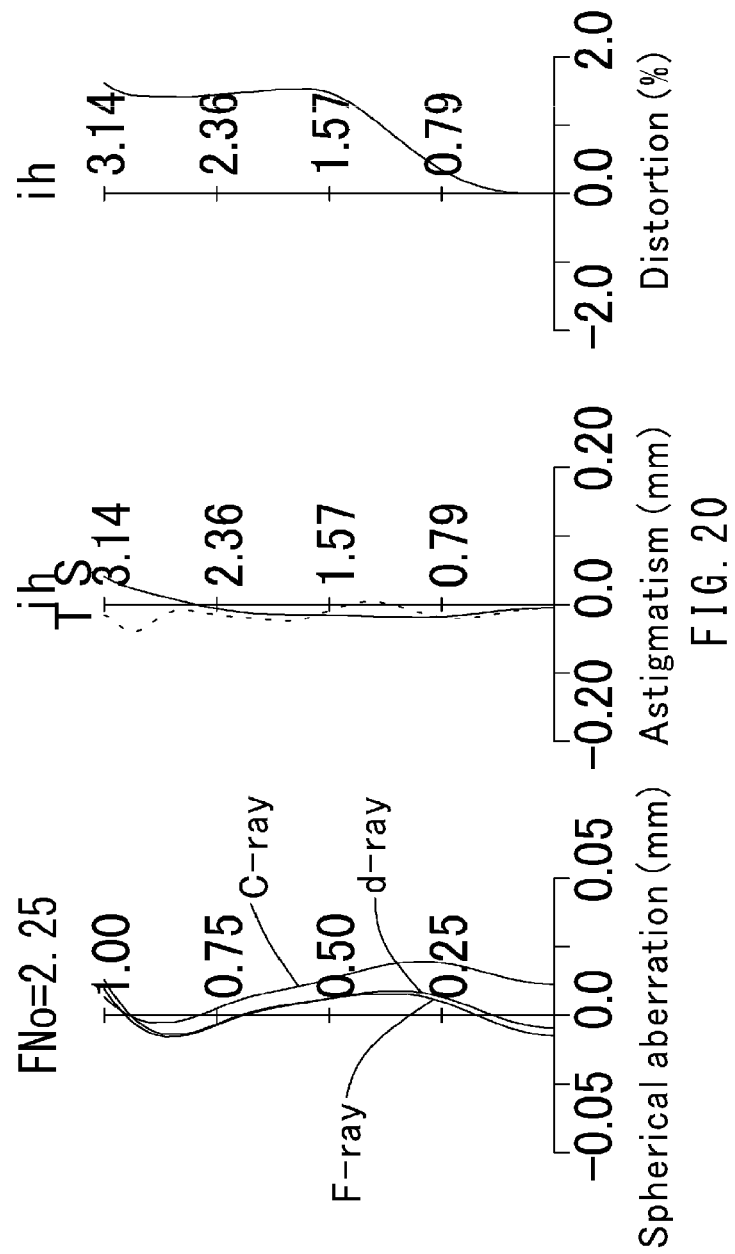
FIG. 20 shows spherical aberration, astigmatism, and distortion of the imaging lens in Example 10 according to the present invention.
Figure 21:
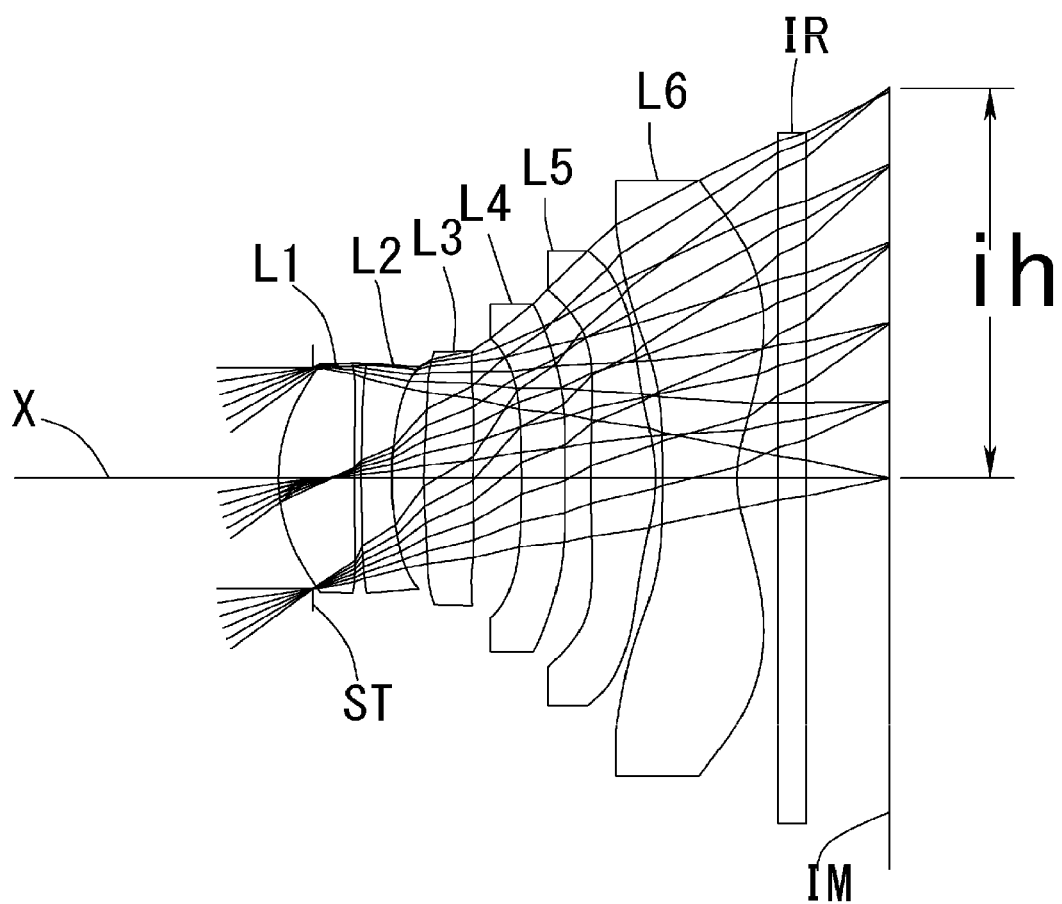
FIG. 21 is a schematic view showing the general configuration of an imaging lens in Example 11 according to the present invention.

FIG. 20 shows spherical aberration (mm), astigmatism (mm), and distortion (%) of the imaging lens in Example 10. As shown in FIG. 20, each aberration is corrected properly.

Example 11

The basic lens data of Example 11 is shown below in Table 11.

TABLE 11

Numerical Data Example 11
Unit mm f = 3.87
Fno = 2.24
ω (°) = 38.7
ih = 3.14
TTL = 4.43

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.255 | | |
| 2* | 1.452 | 0.558 | 1.5443 | 55.86 |
| 3* | 6.829 | 0.054 | | |
| 4* | 5.661 | 0.223 | 1.6391 | 23.25 |
| 5* | 2.388 | 0.237 | | |
| 6* | 4.004 | 0.363 | 1.5348 | 55.66 |
| 7* | 9.272 | 0.356 | | |
| 8* | −25.515 | 0.320 | 1.6391 | 23.25 |
| 9* | 26.636 | 0.193 | | |
| 10* | 27.731 | 0.474 | 1.5348 | 55.66 |
| 11* | −1.446 | 0.050 | | |
| 12* | −415.425 | 0.551 | 1.5348 | 55.66 |
| 13* | 1.094 | 0.300 | | |
| 14 | Infinity | 0.210 | 1.5168 | 64.20 |
| 15 | Infinity | 0.611 | | |
| Image Plane | Infinity | | | |

Constituent Lens Data

| Lens | Start Surface | Focal Length | | |
|---|---|---|---|---|
| 1 | 2 | 3.27 | f12 = 5.28 | |
| 2 | 4 | −6.64 | E5 = 0.29 | |
| 3 | 6 | 12.87 | Ph51 = 0.72 | |
| 4 | 8 | −20.34 | | |
| 5 | 10 | 2.58 | | |
| 6 | 12 | −2.04 | | |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −8.839E−03 | −3.026E−01 | −4.602E−01 | −2.854E−01 | −2.248E−01 | −1.231E−01 |
| A6 | 4.225E−02 | 7.503E−01 | 1.325E+00 | 8.818E−01 | 2.401E−01 | −3.201E−02 |
| A8 | −1.754E−01 | −8.651E−01 | −1.595E+00 | −1.042E+00 | −3.280E−01 | 8.319E−02 |
| A10 | 2.666E−01 | 3.090E−01 | 7.499E−01 | 6.962E−01 | 4.804E−01 | −4.154E−02 |
| A12 | −1.775E−01 | 0.000E+00 | −4.687E−02 | −1.749E−01 | −2.219E−01 | 4.578E−02 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −9.882E+00 | 0.000E+00 | −7.391E+00 |
| A4 | −9.911E−02 | −1.954E−01 | 9.741E−03 | 9.921E−02 | −1.497E−01 | −1.191E−01 |
| A6 | −3.002E−02 | 2.214E−01 | −2.372E−02 | −1.971E−02 | 3.789E−02 | 6.798E−02 |
| A8 | 1.033E−01 | −3.637E−01 | −2.076E−02 | −1.598E−02 | 2.203E−02 | −3.212E−02 |
| A10 | −2.049E−01 | 4.193E−01 | 7.222E−03 | −6.482E−03 | −1.329E−02 | 9.925E−03 |
| A12 | 1.905E−01 | −2.617E−01 | 0.000E+00 | 1.069E−02 | 2.526E−03 | −1.867E−03 |
| A14 | −6.974E−02 | 8.264E−02 | 0.000E+00 | −3.455E−03 | −1.656E−04 | 1.922E−04 |
| A16 | 0.000E+00 | −1.056E−02 | 0.000E+00 | 3.528E−04 | −3.921E−07 | −8.205E−06 |

As shown in Table 13, the imaging lens in Example 11 satisfies conditional expressions (1) to (18).

Figure 22:
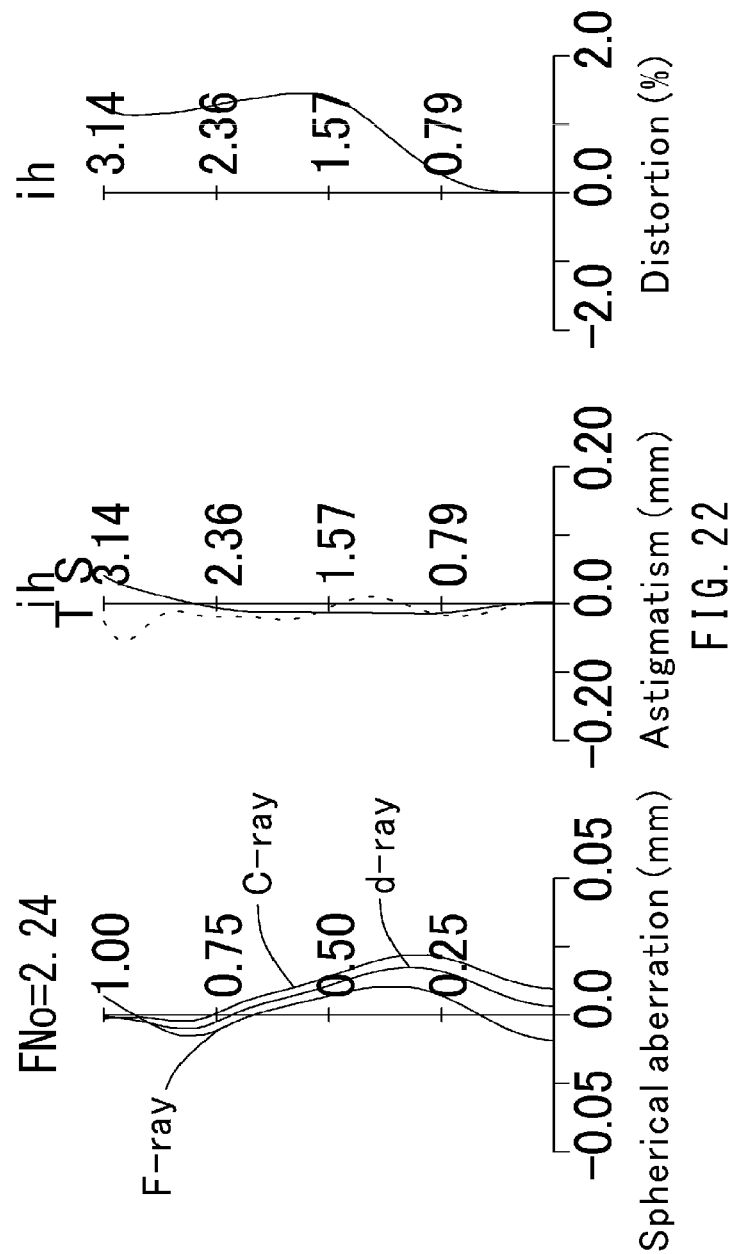
FIG. 22 shows spherical aberration, astigmatism, and distortion of the imaging lens in Example 11 according to the present invention.
Figure 23:
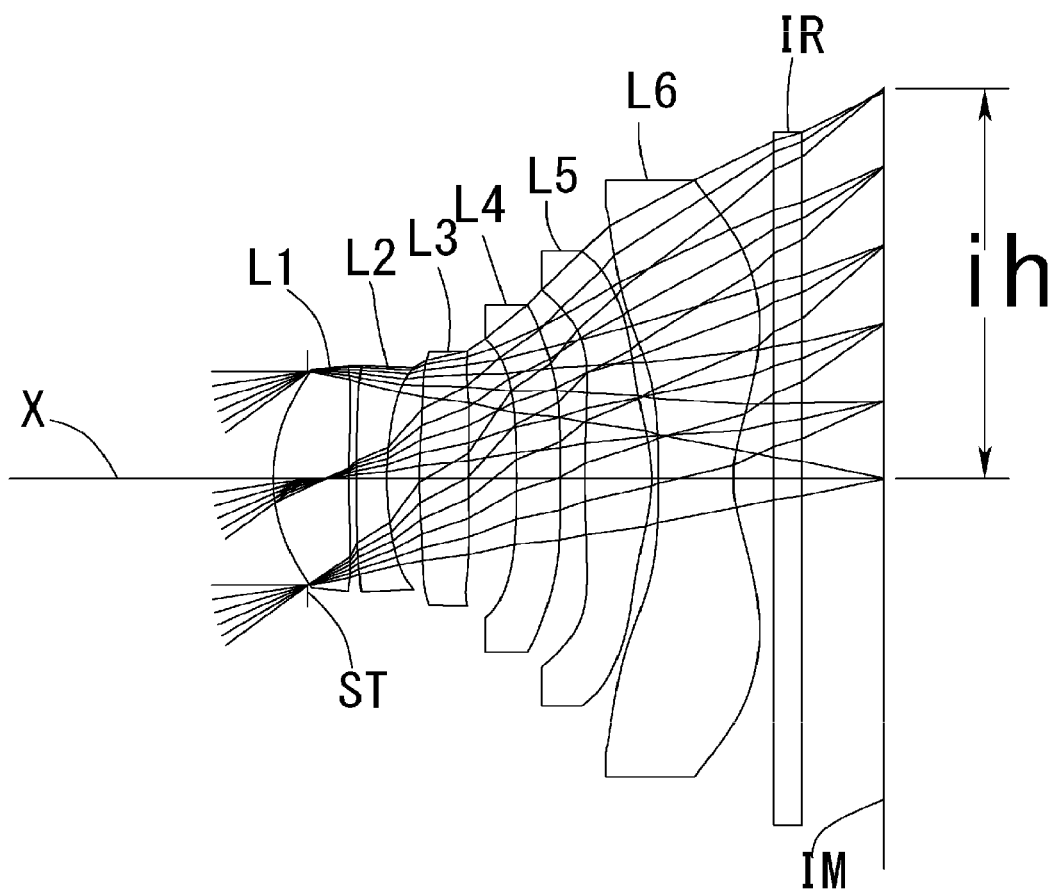
FIG. 23 is a schematic view showing the general configuration of an imaging lens in Example 12 according to the present invention.

FIG. 22 shows spherical aberration (mm), astigmatism (mm), and distortion (%) of the imaging lens in Example 11. As shown in FIG. 22, each aberration is corrected properly.

Example 12

The basic lens data of Example 12 is shown below in Table 12.

TABLE 12

Numerical Data Example 12
Unit mm f = 3.87
Fno = 2.25
ω (°) = 38.7
ih = 3.14
TTL = 4.43

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.255 | | |
| 2* | 1.447 | 0.557 | 1.5443 | 55.86 |
| 3* | 6.293 | 0.055 | | |
| 4* | 5.636 | 0.223 | 1.6391 | 23.25 |
| 5* | 2.454 | 0.241 | | |
| 6* | 4.045 | 0.362 | 1.5348 | 55.66 |
| 7* | 9.717 | 0.355 | | |
| 8* | −16.823 | 0.320 | 1.6391 | 23.25 |
| 9* | 25.711 | 0.184 | | |
| 10* | 13.452 | 0.489 | 1.5348 | 55.66 |
| 11* | −1.432 | 0.050 | | |
| 12* | −30.940 | 0.550 | 1.5348 | 55.66 |
| 13* | 1.100 | 0.300 | | |
| 14 | Infinity | 0.210 | 1.5168 | 64.20 |
| 15 | Infinity | 0.606 | | |
| Image Plane | Infinity | | | |

Constituent Lens Data

| Lens | Start Surface | Focal Length | | |
|---|---|---|---|---|
| 1 | 2 | 3.32 | f12 = 5.24 | |
| 2 | 4 | −6.99 | E5 = 0.29 | |
| 3 | 6 | 12.68 | Ph51 = 0.77 | |
| 4 | 8 | −15.87 | | |
| 5 | 10 | 2.45 | | |
| 6 | 12 | −1.97 | | |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −8.750E−03 | −3.062E−01 | −4.555E−01 | −2.798E−01 | −2.211E−01 | −1.092E−01 |
| A6 | 4.605E−02 | 7.417E−01 | 1.293E+00 | 8.894E−01 | 2.468E−01 | −5.980E−02 |
| A8 | −1.878E−01 | −8.623E−01 | −1.558E+00 | −1.101E+00 | −3.714E−01 | 1.321E−01 |
| A10 | 2.840E−01 | 3.140E−01 | 7.430E−01 | 7.882E−01 | 5.053E−01 | −1.046E−01 |
| A12 | −1.884E−01 | 0.000E+00 | −4.688E−02 | −2.102E−01 | −2.183E−01 | 7.224E−02 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −1.044E+01 | 0.000E+00 | −7.726E+00 |
| A4 | −9.725E−02 | −2.071E−01 | 2.380E−03 | 9.630E−02 | −1.463E−01 | −1.178E−01 |
| A6 | 3.995E−03 | 2.604E−01 | −2.466E−02 | −2.211E−02 | 3.796E−02 | 6.783E−02 |
| A8 | 4.139E−02 | −4.239E−01 | −2.134E−02 | −1.530E−02 | 2.201E−02 | −3.208E−02 |
| A10 | −1.370E−02 | 4.792E−01 | 7.539E−03 | −6.348E−03 | −1.330E−02 | 9.922E−03 |
| A12 | 1.425E−01 | −3.007E−01 | 0.000E+00 | 1.069E−02 | 2.525E−03 | −1.867E−03 |
| A14 | −5.615E−02 | 9.644E−02 | 0.000E+00 | −3.459E−03 | −1.657E−04 | 1.919E−04 |
| A16 | 0.000E+00 | −1.250E−02 | 0.000E+00 | 3.517E−04 | −2.983E−07 | −8.158E−06 |

As shown in Table 13, the imaging lens in Example 12 satisfies conditional expressions (1) to (18).

Figure 24:
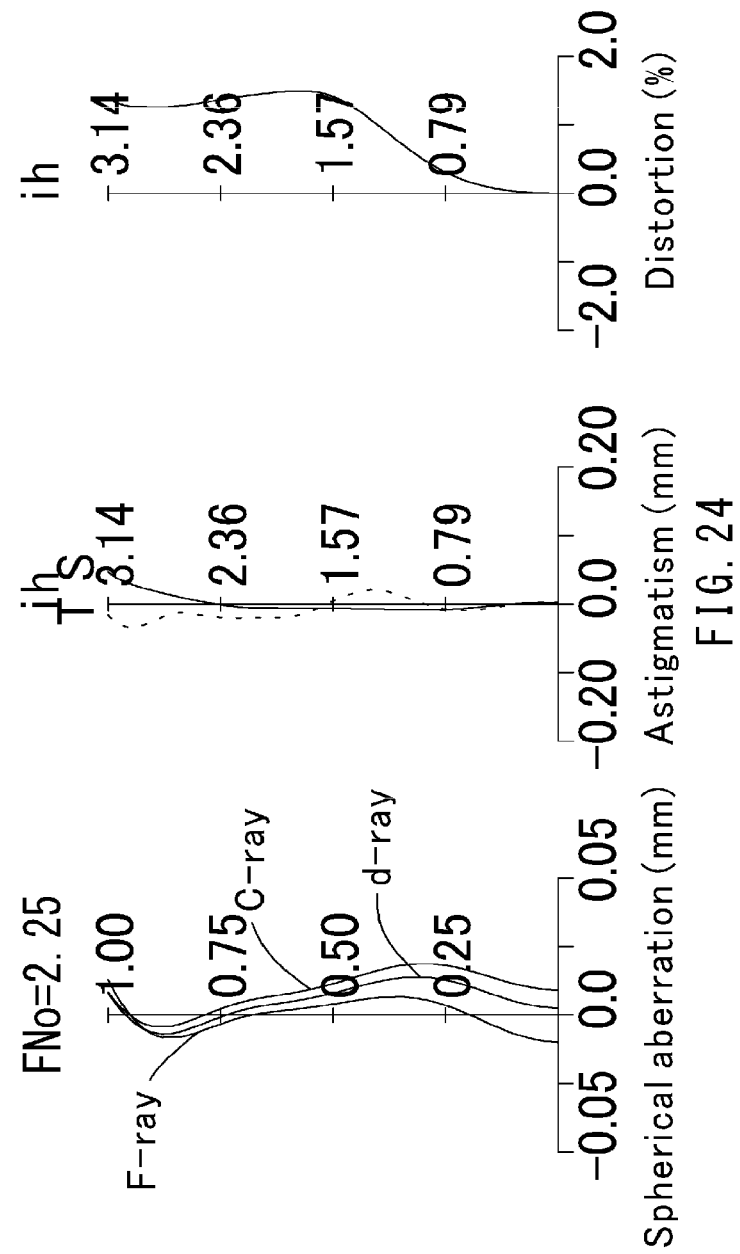
FIG. 24 shows spherical aberration, astigmatism, and distortion of the imaging lens in Example 12 according to the present invention.
Figure 25:
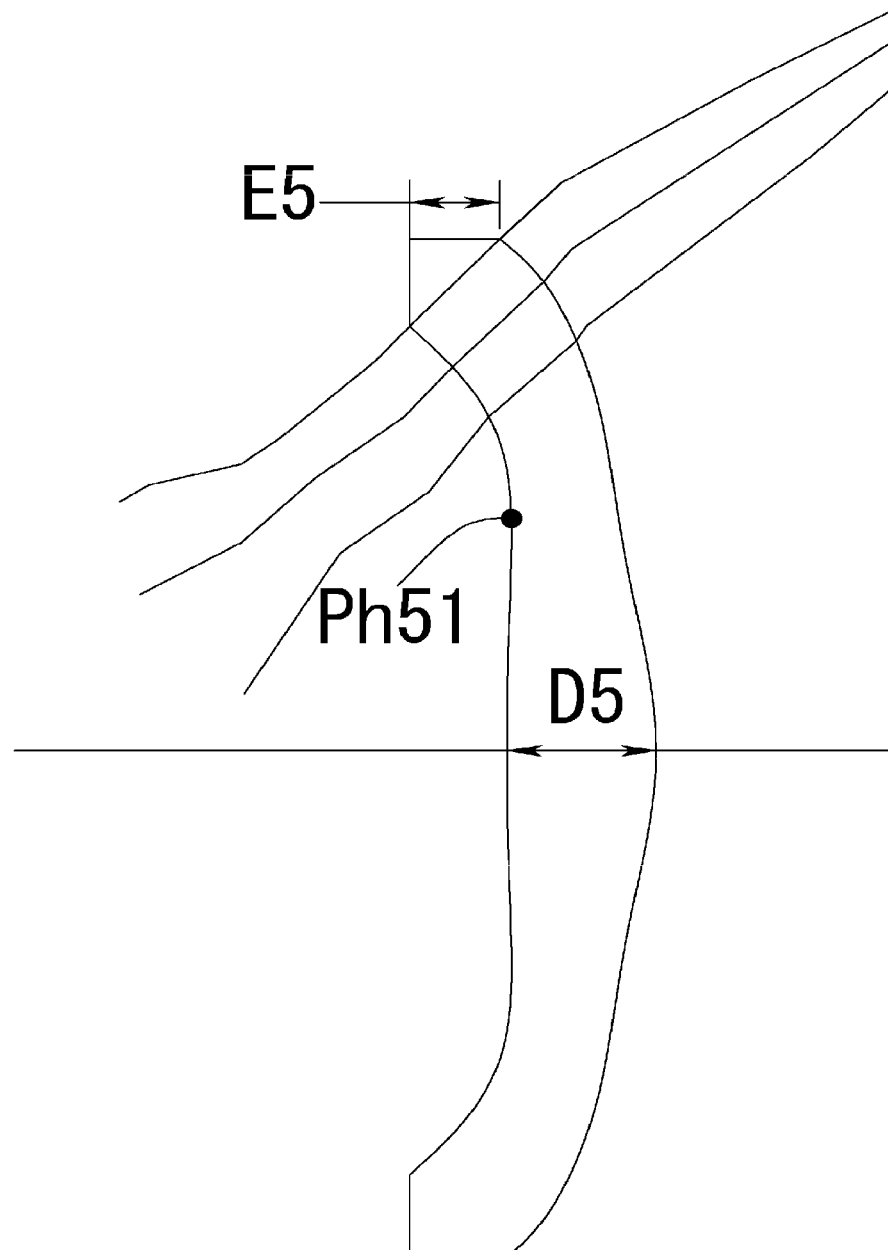
FIG. 25 is a view of the fifth lens of an imaging lens in an example according to the present invention, illustrating vertical height Ph51 of a pole point on the object-side surface from the optical axis, thickness D5 on the optical axis, and edge thickness E5 in the maximum effective diameter.

FIG. 24 shows spherical aberration (mm), astigmatism (mm), and distortion (%) of the imaging lens in Example 12. As shown in FIG. 24, each aberration is corrected properly.

As explained above, the imaging lens according to this embodiment of the present invention achieves low-profileness with a total track length TTL of less than 5 mm, a ratio of total track length TTL to twice the maximum image height ih (TTL/2ih) of about 0.7, and offers high brightness with an F-value of 2.3 or less and a wide field of view of about 80 degrees. Thus, the present invention provides a compact high-resolution imaging lens which satisfies the demand for low-profileness, meets the demands for a low F-value and a wide field of view in a balanced manner, and corrects various aberrations properly, though it is composed of six constituent lenses.

Table 13 shows data on Examples 1 to 12 in relation to the conditional expressions (1) to (18).

TABLE 13

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Conditional Expression (1) AG16/Σd | 0.26 | 0.26 | 0.24 | 0.24 | 0.27 | 0.27 | 0.26 | 0.27 | 0.25 | 0.26 | 0.26 | 0.26 |
| Conditional Expression (2) vd3 − vd4 | 32.4 | 32.4 | 32.4 | 32.4 | 32.4 | 32.4 | 32.4 | 32.4 | 32.4 | 32.4 | 32.4 | 32.4 |
| Conditional Expression (3) Ph51/ih | 0.25 | 0.26 | 0.27 | 0.27 | 0.31 | 0.29 | 0.24 | 0.25 | 0.25 | 0.24 | 0.23 | 0.25 |
| Conditional Expression (4) (f5 + \|f6\|)/f | 1.11 | 1.07 | 0.87 | 0.87 | 1.09 | 1.10 | 1.08 | 1.07 | 1.05 | 1.17 | 1.19 | 1.14 |
| Conditional Expression (5) f1/f | 0.87 | 0.90 | 0.90 | 0.86 | 0.94 | 0.93 | 0.88 | 0.85 | 0.82 | 0.84 | 0.84 | 0.86 |
| Conditional Expression (6) (r3 + r4)/(r3 − r4) | 2.67 | 2.97 | 3.29 | 2.28 | 3.12 | 3.04 | 2.62 | 2.48 | 2.13 | 2.40 | 2.46 | 2.54 |
| Conditional Expression (7) P4 < P2 < P6 | YES | YES | YES | YES | YES | YES | YES | YES | YES | YES | YES | YES |
| P2 = (\|1/f2\|) | 0.14 | 0.10 | 0.10 | 0.11 | 0.12 | 0.11 | 0.12 | 0.12 | 0.12 | 0.15 | 0.15 | 0.14 |
| P4 = (\|1/f4\|) | 0.07 | 0.06 | 0.09 | 0.07 | 0.04 | 0.05 | 0.01 | 0.02 | 0.06 | 0.05 | 0.05 | 0.06 |
| P6 = (\|1/f6\|) | 0.52 | 0.49 | 0.58 | 0.59 | 0.53 | 0.52 | 0.55 | 0.55 | 0.55 | 0.50 | 0.49 | 0.51 |
| Conditional Expression (8) P3 < P1 < P5 | YES | YES | YES | YES | YES | YES | YES | YES | YES | YES | YES | YES |
| P1 = (1/f1) | 0.30 | 0.26 | 0.26 | 0.27 | 0.28 | 0.28 | 0.30 | 0.30 | 0.32 | 0.31 | 0.31 | 0.30 |
| P3 = (1/f3) | 0.08 | 0.07 | 0.05 | 0.04 | 0.04 | 0.03 | 0.03 | 0.03 | 0.04 | 0.07 | 0.08 | 0.08 |
| P5 = (1/f5) | 0.42 | 0.39 | 0.50 | 0.50 | 0.44 | 0.44 | 0.43 | 0.43 | 0.44 | 0.40 | 0.39 | 0.41 |
| Conditional Expression (9) vd1 − vd2 | 32.6 | 34.3 | 34.3 | 34.3 | 32.6 | 32.6 | 32.6 | 32.6 | 32.6 | 32.6 | 32.6 | 32.6 |
| Conditional Expression (10) vd5 | 55.7 | 55.7 | 55.7 | 55.7 | 55.7 | 55.7 | 55.7 | 55.7 | 55.7 | 55.7 | 55.7 | 55.7 |
| Conditional Expression (11) vd6 | 55.7 | 55.7 | 55.7 | 55.7 | 55.7 | 55.7 | 55.7 | 55.7 | 55.7 | 55.7 | 55.7 | 55.7 |
| Conditional Expression (12) D5/D6 | 0.91 | 0.95 | 1.12 | 1.04 | 1.04 | 1.05 | 1.05 | 0.99 | 1.03 | 0.89 | 0.86 | 0.89 |
| Conditional Expression (13) (T5/f) * 100 | 1.30 | 2.04 | 0.47 | 0.47 | 2.65 | 2.66 | 1.54 | 1.40 | 1.60 | 1.29 | 1.29 | 1.29 |
| Conditional Expression (14) \|r7\|/f | 2.32 | 1.60 | 1.28 | 2.44 | 1.18 | 1.72 | 1.78 | 4.25 | 1.53 | 14.34 | 6.59 | 4.35 |
| Conditional Expression (15) E5/D6 | 0.59 | 0.58 | 0.54 | 0.56 | 0.58 | 0.55 | 0.56 | 0.58 | 0.55 | 0.60 | 0.62 | 0.60 |
| Conditional Expression (16) f12/f | 1.34 | 1.30 | 1.27 | 1.25 | 1.38 | 1.30 | 1.27 | 1.22 | 1.15 | 1.35 | 1.36 | 1.35 |
| Conditional Expression (17) ih/f | 0.81 | 0.82 | 0.82 | 0.82 | 0.82 | 0.82 | 0.82 | 0.81 | 0.82 | 0.81 | 0.81 | 0.81 |
| Conditional Expression (18) TTL/2ih | 0.70 | 0.71 | 0.71 | 0.71 | 0.70 | 0.70 | 0.70 | 0.70 | 0.70 | 0.70 | 0.70 | 0.70 |

When the imaging lens composed of six constituent lenses according to the present invention is used in an image pickup device mounted in an increasingly compact and low-profile smartphone or mobile terminal, game console, information terminal such as a PC or robot, home appliance or vehicle with a camera function, it contributes to making the camera low-profile and offering a wide field of view, and enhances the camera performance.

What is claimed is:

1. An imaging lens which forms an image of an object on a solid-state image sensor, comprising exactly six lenses arranged, in the following order from an object side to an image side:
   a first lens with positive refractive power as a meniscus lens having a convex surface on the object side;
   a second lens with refractive power as a meniscus lens having a concave surface on the image side;
   a third lens with positive refractive power as a meniscus lens;
   a fourth lens with refractive power as a meniscus lens;
   a fifth lens that is a double-sided aspheric lens with positive refractive power having a convex surface on the object side; and
   a sixth lens that is a double-sided aspheric lens with negative refractive power having a concave surface on the object side,
   wherein conditional expressions (12) and (14) below are satisfied:

$$0.75 < D5/D6 < 1.50 \tag{12}$$

$$0.6 < |r7|/f < 17.0 \tag{14}$$

where
D5: thickness of the fifth lens on an optical axis
D6: thickness of the sixth lens on the optical axis
f: focal length of an overall optical system of the imaging lens
r7: curvature radius of the object-side surface of the fourth lens.

2. The imaging lens according to claim 1, wherein an aperture stop is located on the object side of the first lens.

3. The imaging lens according to claim 1, comprising:
   a first lens group with positive composite refractive power including the first lens, the second lens, and the third lens; and
   a second lens group with negative composite refractive power including the fourth lens, the fifth lens, and the sixth lens.

4. The imaging lens according to claim 1, wherein a conditional expression (1) below is satisfied:

$$0.18 < AG16/\Sigma d < 0.3 \tag{1}$$

where
AG16: sum of air gaps on an optical axis from the first lens to the sixth lens
$\Sigma d$: distance on the optical axis from the object-side surface of the first lens to the image-side surface of the sixth lens.

5. The imaging lens according to claim 1, wherein a conditional expression (2) below is satisfied:

$$20 < vd3 - vd4 < 40 \tag{2}$$

where
vd3: Abbe number of the third lens at d-ray
vd4: Abbe number of the fourth lens at d-ray.

6. The imaging lens according to claim 1, wherein the object-side surface of the fifth lens has a pole point off an optical axis.

7. The imaging lens according to claim 6, wherein a conditional expression (3) below is satisfied:

$$0.2 < Ph51/ih < 0.9 \tag{3}$$

where
Ph51: vertical height of the pole point on the object-side surface of the fifth lens from the optical axis
ih: maximum image height.

8. The imaging lens according to claim 1, wherein a conditional expression (4) below is satisfied:

$$(f5 + |f6|)/f < 1.3 \tag{4}$$

where
f: focal length of an overall optical system of the imaging lens
f5: focal length of the fifth lens
f6: focal length of the sixth lens.

9. The imaging lens according to claim 1, wherein a conditional expression (5) below is satisfied:

$$0.5 < f1/f < 1.5 \tag{5}$$

where
f: focal length of an overall optical system of the imaging lens
f1: focal length of the first lens.

10. The imaging lens according to claim 1, wherein a conditional expression (6) below is satisfied:

$$1.5 < (r3 + r4)/(r3 - r4) < 4.5 \tag{6}$$

where
r3: curvature radius of the object-side surface of the second lens
r4: curvature radius of the image-side surface of the second lens.

11. The imaging lens according to claim 1, wherein the fourth lens has a concave surface on the object side and has having negative refractive power.

12. The imaging lens according to claim 11, wherein the second lens, and the fourth lens have negative refractive power and satisfy a conditional expression (7) below:

$$P4 < P2 < P6 \tag{7}$$

where
P2: refractive power of the second lens
P4: refractive power of the fourth lens
P6: refractive power of the sixth lens.

13. The imaging lens according to claim 11, wherein the first lens, the third lens, and the fifth lens satisfy a conditional expression (8) below:

$$P3 < P1 < P5 \tag{8}$$

where
P1: refractive power of the first lens
P3: refractive power of the third lens
P5: refractive power of the fifth lens.

14. The imaging lens according to claim 1, wherein the image-side surface of the sixth lens has a pole point off an optical axis.

15. The imaging lens according to claim 1, wherein a conditional expression (9) below is satisfied:

$$20 < vd1 - vd2 < 40 \tag{9}$$

where
vd1: Abbe number of the first lens at d-ray
vd2: Abbe number of the second lens at d-ray.

16. The imaging lens according to claim 15, wherein conditional expressions (10) and (11) below are satisfied:

$$50 < vd5 < 70 \quad (10)$$

$$50 < vd6 < 70 \quad (11)$$

where
vd5: Abbe number of the fifth lens at d-ray
vd6: Abbe number of the sixth lens at d-ray.

17. The imaging lens according to claim 1, wherein a conditional expression (13) below is satisfied:

$$0.35 < (T5/f) \times 100 < 3.00 \quad (13)$$

where
T5: distance on the optical axis from the image-side surface of the fifth lens to the object-side surface of the sixth lens
f: focal length of an overall optical system of the imaging lens.

18. The imaging lens according to claim 1, wherein a conditional expression (15) below is satisfied:

$$0.45 < E5/D5 < 1.20 \quad (15)$$

where
E5: edge thickness of the fifth lens in a maximum effective diameter
D5: thickness of the fifth lens on an optical axis.

19. The imaging lens according to claim 1, wherein a conditional expression (16) below is satisfied:

$$0.6 < f12/f < 2.0 \quad (16)$$

where
f: focal length of an overall optical system of the imaging lens
f12: composite focal length of the first lens and the second lens.

20. The imaging lens according to claim 1, wherein a conditional expression (17) below is satisfied:

$$0.80 < ih/f < 1.0 \quad (17)$$

where
f: focal length of an overall optical system of the imaging lens
ih: maximum image height.

21. The imaging lens according to claim 1, wherein a conditional expression (18) below is satisfied:

$$TTL/2ih < 1.0 \quad (18)$$

where
TTL: total track length
ih: maximum image height.

* * * * *